United States Patent
Suzuki et al.

(10) Patent No.: US 9,457,416 B2
(45) Date of Patent: Oct. 4, 2016

(54) FILLET WELD JOINT AND METHOD FOR GAS SHIELDED ARC WELDING

(75) Inventors: Reiichi Suzuki, Fujisawa (JP); Masao Kinefuchi, Kobe (JP); Ryu Kasai, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1251 days.

(21) Appl. No.: 13/167,260

(22) Filed: Jun. 23, 2011

(65) Prior Publication Data

US 2012/0003035 A1    Jan. 5, 2012

(30) Foreign Application Priority Data

Jul. 1, 2010    (JP) .................. 2010-151082

(51) Int. Cl.
| | | |
|---|---|---|
| *B25G 3/34* | (2006.01) | |
| *F16B 11/00* | (2006.01) | |
| *F16B 12/04* | (2006.01) | |
| *F16L 13/00* | (2006.01) | |
| *B23K 9/025* | (2006.01) | |
| *B23K 9/09* | (2006.01) | |
| *B23K 9/173* | (2006.01) | |
| *B23K 9/23* | (2006.01) | |

(Continued)

(52) U.S. Cl.
CPC ............. *B23K 9/025* (2013.01); *B23K 9/09* (2013.01); *B23K 9/173* (2013.01); *B23K 9/23* (2013.01); *B23K 31/12* (2013.01); *B23K 35/0266* (2013.01); *B23K 35/3053* (2013.01); *B23K 35/383* (2013.01); *C21D 9/50* (2013.01); *B23K 2203/04* (2013.01); *Y10T 403/478* (2015.01)

(58) Field of Classification Search
CPC .... Y10T 403/478; B23K 9/025; B23K 9/09; B23K 9/173; B23K 9/23; B23K 31/12; B23K 2203/04; B23K 35/0266; B23K 35/3053; B23K 35/383; C21D 9/50
USPC ................. 403/270–272; 148/320, 519, 521; 228/138, 200; 219/74, 75, 130.5, 219/130.51, 145.22, 146.1, 146.21
See application file for complete search history.

(56) References Cited

U.S. PATENT DOCUMENTS

| | | | | |
|---|---|---|---|---|
| 4,097,716 A | * | 6/1978 | Reichelt et al. | .......... 219/137 R |
| 4,800,131 A | * | 1/1989 | Marshall et al. | ............. 428/558 |

(Continued)

FOREIGN PATENT DOCUMENTS

| | | |
|---|---|---|
| CN | 101559544 A | 10/2009 |
| JP | 54-130451 | 10/1979 |

(Continued)

OTHER PUBLICATIONS

Extended European Search Report issued on Oct. 13, 2011, in Patent Application No. 11005035.8.

(Continued)

*Primary Examiner* — Gregory Binda
*Assistant Examiner* — Nahid Amiri
(74) *Attorney, Agent, or Firm* — Oblon, McClelland, Maier & Neustadt, L.L.P.

(57) ABSTRACT

A fillet weld joint of steel formed by arc welding, wherein a martensitic transformation starting temperature (Ms point) of a weld metal is 400° C. or above and 550° C. or below, a value obtained by dividing a toe radius ρ of a toe part of welding by a sheet thickness t of a base metal (ρ/t) is 0.25 or above, an expression Ms(° C.)≤375×[ρ/t]+320 is satisfied, and a crack defect does not exist in the fillet weld joint.

10 Claims, 5 Drawing Sheets

(51) Int. Cl.
  *B23K 31/12* (2006.01)
  *B23K 35/02* (2006.01)
  *B23K 35/30* (2006.01)
  *B23K 35/38* (2006.01)
  *C21D 9/50* (2006.01)

(56) References Cited

U.S. PATENT DOCUMENTS

| | | | | |
|---|---|---|---|---|
| 5,134,267 | A | * | 7/1992 | Atsumi et al. .................. 219/61 |
| 6,362,456 | B1 | * | 3/2002 | Ludewig et al. ........ 219/124.34 |
| 6,559,417 | B2 | * | 5/2003 | Kim et al. ............... 219/145.22 |
| 6,784,402 | B2 | * | 8/2004 | Kataoka et al. ........... 219/146.1 |
| 7,005,607 | B2 | * | 2/2006 | Takatani et al. ......... 219/124.34 |
| 7,294,212 | B2 | * | 11/2007 | Hirasawa et al. ............ 148/325 |
| 7,325,717 | B2 | * | 2/2008 | Morikage et al. ......... 228/262.4 |
| 2003/0094444 | A1 | * | 5/2003 | Kato et al. ............... 219/145.22 |
| 2004/0226634 | A1 | * | 11/2004 | Hirasawa et al. ............ 148/609 |
| 2007/0108174 | A1 | * | 5/2007 | Narayanan et al. .... 219/137 PS |
| 2008/0156784 | A1 | * | 7/2008 | Suzuki et al. ............. 219/146.1 |
| 2008/0292443 | A1 | * | 11/2008 | Nose et al. ................... 414/722 |
| 2009/0261085 | A1 | | 10/2009 | Suzuki et al. |
| 2010/0089888 | A1 | * | 4/2010 | Forck et al. ................. 219/136 |

FOREIGN PATENT DOCUMENTS

| | | | |
|---|---|---|---|
| JP | 4-361876 | A | 12/1992 |
| JP | 06317411 | A * | 11/1994 |
| JP | 6-340947 | | 12/1994 |
| JP | 7-171679 | | 7/1995 |
| JP | 8-25080 | | 1/1996 |
| JP | 9-227987 | | 9/1997 |
| JP | 2000-288728 | | 10/2000 |
| JP | 2001-246495 | | 9/2001 |
| JP | 2002-273599 | | 9/2002 |
| JP | 2002-361480 | | 12/2002 |
| JP | 2002-361481 | | 12/2002 |
| JP | 2004-1075 | | 1/2004 |
| JP | 2004-98108 | | 4/2004 |
| JP | 2004-98109 | | 4/2004 |
| JP | 2004-98113 | | 4/2004 |
| JP | 2004-98114 | | 4/2004 |
| JP | 2004-136312 | | 5/2004 |
| JP | 2004-136313 | | 5/2004 |
| JP | 2005-238305 | | 9/2005 |
| JP | 2006-289421 | | 10/2006 |
| JP | 2007-289965 | A | 11/2007 |
| JP | 4173957 | | 8/2008 |
| JP | 4173999 | | 8/2008 |

OTHER PUBLICATIONS

Office Action issued Jun. 4, 2013, in Japanese Patent Application No. 2010-151082 (with English-language translation).
Office Action issued May 2, 2013 in Chinese Patent Application No. 201110181450.1 (with English translation).

* cited by examiner

FILLET WELD JOINT AND METHOD FOR GAS SHIELDED ARC WELDING

BACKGROUND OF THE INVENTION

1. Field of the Invention

The present invention relates to a fillet weld joint and a method for gas shielded arc welding which are of low cost and capable of improving the fatigue strength without involving the risk of causing weld cracking in fillet welding of carbon steel.

2. Description of the Related Art

In recent years, in transportation apparatuses such as automobiles, ships and the like, high tensile strength steel sheets have been more actively used in order to reduce the mass with the aim of improving fuel economy. Similar to mild steel, the high tensile strength steel sheet is arc-welded, however there is a problem that only the fatigue strength similar to that of mild steel can be secured in the weld joint, the fatigue strength of the weld bead lowers than that of the base metal, and intrinsic performance of the high tensile strength steel sheet cannot be exerted.

The main causes the fatigue strength of the weld bead becomes lower than that of the base metal are considered to be (1) the stress concentration at a toe part and (2) the tensile residual stress caused by thermal expansion and shrinkage, and improvements have been tried until now by a number of measures.

With regards to them, relaxing of the stress concentration and lowering the tensile residual stress will be described below.

<Relaxing of Stress Concentration>

In order to relax the stress concentration of a toe part of welding, measures of smoothing the bead shape such as reducing the contact angle and increasing the toe radius have been devised. For example, in Japanese Unexamined Patent Application Publication Nos. H6-340947, H8-25080, 2002-361480 and 2002-361481, it is shown that relaxation of the stress concentration can be achieved by limiting the chemical composition of a steel sheet, use of a wire added with a special composition lowering the surface tension, limiting the welding condition such as the voltage, and the like. However, because there have been many restrictions on conditions, these measures have showed poor versatility. Also, until now, actually there is no technology significantly improving the toe shape only by simply performing welding. Furthermore, according to the result of a confirmation experiment carried out by the present inventors, it was clarified that the fatigue strength improving effect was weak only by relaxation of the stress concentration. That is, improvement of the fatigue strength cannot be achieved only by improvement of the stress concentration.

<Lowering of Tensile Residual Stress (Lowering of Yield Stress of Weld Metal; Due to Improvement of Ductility)>

In Japanese Unexamined Patent Application Publication Nos. H7-171679 and H9-227987, an idea of making the weld metal easily deformable in order to lower the residual stress is proposed. However, in Japanese Unexamined Patent Application Publication No. H7-171679, a concrete welding means was not proposed and was not practical, whereas in Japanese Unexamined Patent Application Publication No. H9-227987, because the deoxidizing composition was reduced excessively and the strength was lowered in a welding wire, there were such problems that a blowhole defect was liable to be generated due to insufficient deoxidization, and that the static tensile strength of the joint became insufficient when applied to a high strength steel sheet.

<Lowering of Tensile Residual Stress (by Stress Relief Annealing)>

As a method for removing a residual stress known best from the past, there is stress relief annealing that retains a high temperature in an annealing furnace (PWHT). However, in the industry related to transportation apparatuses in which the steel material handled is mainly of comparatively thin thickness, the manufacturers possessing a facility are quite rare, and even if such facility is introduced, the production efficiency drops significantly which increases the cost.

<Lowering of Tensile Residual Stress (by Peening)>

There are measures generating a compressive stress after welding called shot peening, hammer peening, and ultrasonic peening, which are proposed in Japanese Unexamined Patent Application Publication No. 2004-136312 also. However, in these measures also, introduction of the facility is required, the production efficiency drops significantly, and the cost is increased.

<Lowering of Tensile Residual Stress (by Low Temperature Transformation Welding Material)>

Under the circumstance, as a measure watched recently, a method is watched in which the martensitic transformation point (Ms point) of the weld metal is lowered and a compressive residual stress is imparted or a tensile residual stress is reduced in expansion transformation at a room temperature. For example, in Japanese Unexamined Patent Application Publication No. S54-130451, a method lowering the Ms point by a weld metal containing both of high Cr and high Ni is proposed. Thereafter, a number of proposals according to the method have been propounded. For example, in Japanese Unexamined Patent Application Publication Nos. 2000-288728, 2001-246495, 2002-273599, 2004-98108, 2004-98109, 2004-98113, 2004-98114 and 2005-238305, a high Cr, High Ni, or high Mn-based weld metal or welding wire is stipulated.

In Japanese Patent No. 4173957, a method for lap fillet welding for a thin sheet is proposed in which the Ms point of a low temperature of 200-350° C. is achieved using a low temperature welding wire of high C content of 0.45-0.7 mass %, and the depth of welding penetration is limited to ⅔ or below of the sheet thickness. Also, in Japanese Unexamined Patent Application Publication No. 2004-136313, a method for lap fillet welding for a thin sheet is proposed in which the Ms point of a low temperature of 250-400° C. is achieved using a low temperature welding wire of high C content of 0.35-0.7 mass % in a similar manner, the depth of welding penetration is limited to ½ or below of the sheet thickness, and the toe part of the weld bead is recessed from the surface of the steel sheet.

On the other hand, in Japanese Patent No. 4173999, a method for fillet welding is proposed in which cracking resistance and absorbed energy of the weld metal are improved by setting the Ms point comparatively high at 475-550° C., and making the depth of welding penetration ⅓ or below of the sheet thickness and the constraining degree 4,000 N/mm·mm.

However, in the fillet weld joints and the methods for fillet welding according to the prior arts, there are such problems as described below.

According to the invention described in all of Japanese Unexamined Patent Application Publication Nos. S54-130451, 2000-288728, 2001-246495, 2002-273599, 2004-98108, 2004-98109, 2004-98113, 2004-98114 and 2005-

238305, because a large amount of expensive elements are added and in addition, the wire drawability is inferior when a solid wire is used, the weld material becomes expensive. Also, the worst defect in practical use is a problem that the weld bead becomes a high hardness metal accompanying lowering of the Ms point and increase of the risk of causing delayed cracking (that is, hydrogen cracking) is inevitable. Even if cracking is not caused immediately after welding because the sheet thickness is thin and constraint is less, according to the use environment thereafter, encroachment of hydrogen due to corrosion and embrittlement possibly occur, and the risk of delayed cracking remains. In order to avoid it, it is necessary to perform heat treatment of heating the welded body before and after welding to release diffusible hydrogen, however when a number of joints are mass-produced as in the case of the transportation apparatuses, such procedure is not realistic in fact in terms of the cost. Also, in general, as the martensitic structure becomes dominant, metal becomes brittle and is liable to cause the brittle fracture. Further, the Charpy absorbed energy as a general indicator for such characteristic lowers.

According to the invention described in Japanese Patent No. 4173957 and Japanese Unexamined Patent Application Publication No. 2004-136313, because C content is high, delayed cracking is liable to occur as described above, and hot cracking (that is, solidification cracking) is also liable to occur. Further, the Charpy absorbed energy is also low. In addition, it is also difficult to manage the depth of welding penetration and the recess amount of the bead in actual production.

According to the invention described in Japanese Patent No. 4173999, it is also difficult to manage the depth of welding penetration and the constraining degree in actual production, and the fatigue strength improving effect lowers because the Ms point rises.

As described above, the measures depending upon lowering of the tensile residual stress due to low temperature transformation are not realistic.

SUMMARY OF THE INVENTION

The present invention was developed in view of such circumstances and its object is to provide a fillet weld joint having high fatigue strength, free of cracking, and excellent in toughness achieved by improving stress concentration without excessively depending upon generation of a compressive residual stress in a toe part by a welding material and a method for gas shielded arc welding for obtaining the fillet weld joint.

The fillet weld joint in relation with an embodiment of the present invention is a fillet weld joint of steel formed by arc welding in which a martensitic transformation starting temperature (Ms point) of a weld metal is 400° C. or above and 550° C. or below, a value obtained by dividing a toe radius ρ of a toe part of welding by the sheet thickness t of a base metal (ρ/t), that is a ratio ρ/t of the toe radius ρ and the sheet thickness t of the base metal, is 0.25 or above, an expression below $$Ms(°\text{ C.}) \leq 375 \times [\rho/t] + 320 \qquad (1)$$

is satisfied, and a crack defect does not exist.

According to such constitution, by making the Ms point of the weld metal 400° C. or above and 550° C. or below, expansion transformation is caused without lowering cracking resistance and toughness, a tensile residual stress reduces, and a compressive residual stress is generated. Also, by making ρ/t 0.25 or above, the stress concentration is substantially relaxed, and the fatigue strength improves. Further, by satisfying the expression (1), the composite effect of stress concentration relaxation and residual tensile stress relaxation becomes effective.

Also, the fillet weld joint in relation with an embodiment of the present invention is a fillet weld joint of steel formed by arc welding using pure Ar gas as a shielding gas and using a flux-cored wire as a wire in which the wire uses a steel hoop or a steel pipe as a sheath, contains, in terms of the total mass of the wire, C: 0.08-0.32 mass %, Si: 0.40-3.00 mass %, Mn: 1.00-5.00 mass %, P: 0.030 mass % or below, S: 0.030 mass % or below, and suppresses total oxides to 1.0 mass % or below (inclusive of 0 mass %), with a mass ratio of total flux with respect to the wire being 7-30 mass %, a current or voltage waveform of a power source is formed employing using a pulse waveform, and a crack defect does not exist.

According to such constitution, a toe radius ρ of a toe part of welding increases by using pure Ar gas as the shielding gas, and welding with pure Ar gas is allowed by using a flux-cored wire as a wire. Also, the quenchability improves by containing C and Mn by a predetermined amount, the wettability of the base metal and the weld bead improves by containing Si by a predetermined amount, and occurrence of solidification cracking is inhibited by suppressing P and S to a predetermined amount or below. Further, by suppressing the total of oxides to a predetermined amount or below, the arc stability is not impeded, the bead shape becomes normal, and the stress concentration is relaxed. Furthermore, by stipulating a mass ratio of the total flux with respect to the wire, the arc is stabilized adequately in pure Ar shielding gas, and stage melting is properly performed. In addition, by employing a pulse waveform, the action of the high current zone can be constantly used regardless of the average current, therefore a pinching force is imparted, and orderly droplet detachment is achieved.

Also, the fillet weld joint in relation with an embodiment of the present invention is a fillet weld joint of steel formed by arc welding using pure Ar gas as a shielding gas and using a flux-cored wire as a wire in which the wire uses a steel hoop or a steel pipe as a sheath, contains, in terms of the total mass of the wire, C: 0.08-0.32 mass %, Si: 0.40-3.00 mass %, Mn: 1.00-5.00 mass %, P: 0.030 mass % or below, S: 0.030 mass % or below, and suppresses total oxides to 1.0 mass % or below, with a mass ratio of total flux with respect to the wire being 7-30 mass %, a current or voltage waveform of a power source is formed employing a pulse waveform, a martensitic transformation starting temperature (Ms point) of a weld metal is 400° C. or above and 550° C. or below, a value obtained by dividing a toe radius ρ of a toe part of welding by the sheet thickness t of a base metal (ρ/t) is 0.25 or above, an expression below $$Ms(°\text{ C.}) \leq 375 \times [\rho/t] + 320 \qquad (1)$$

is satisfied, and a crack defect does not exist.

According to such constitution, a toe radius ρ of a toe part of welding increases by using pure Ar gas as a shielding gas, and welding with pure Ar gas is allowed by using a flux-cored wire as a wire. Also, the quenchability improves by containing C and Mn by a predetermined amount, the wettability of the base metal and the weld bead improves by containing Si by a predetermined amount, and occurrence of solidification cracking is inhibited by suppressing P and S to a predetermined amount or below. Further, by suppressing the total of oxides to a predetermined amount or below, the arc stability is not impeded, the bead shape becomes normal, and the stress concentration is relaxed. Furthermore, by stipulating a mass ratio of total flux with respect to the wire, the arc is stabilized adequately in pure Ar shielding gas, and stage melting is properly performed. In addition, by employing a pulse waveform, the action of the high current zone can be constantly used regardless of the average current, therefore a pinching force is imparted, and orderly droplet detachment is achieved.

Also, by making the Ms point of the weld metal 400° C. or above and 550° C. or below, expansion transformation is caused without lowering cracking resistance and toughness, a tensile residual stress reduces, and a compressive residual stress is generated. Also, by making ρ/t 0.25 or above, the stress concentration is substantially relaxed, and the fatigue strength improves. Further, by satisfying the expression (1), the composite effect of stress concentration relaxation and residual tensile stress relaxation becomes effective.

Also, in the fillet weld joint in relation with an embodiment of the present invention, the wire may further contain, in terms of the total mass of the wire, a total of Ti, Zr, Al and Mg (Ti+Zr+Al+Mg) by 0.80 mass % or below.

By containing these compositions, the surface tension of the droplets rises, the length of the molten part of the tip of the wire is shortened, and the arc stability in a pure Ar gas atmosphere is improved.

Also, in the fillet weld joint in relation with an embodiment of the present invention, the wire may further contain, in terms of the total mass of the wire, at least one element out of Ni: 3.0 mass % or below, Cr: 3.0 mass % or below and Mo: 3.0 mass % or below.

By containing these compositions, the Ms point lowers and the quenchability improves without lowering the toughness.

Also, in the fillet weld joint in relation with an embodiment of the present invention, the expression (1) may be an expression below instead.

$$Ms(°C.) \leq 375 \times [\rho/t] + 250 \quad (2)$$

According to such constitution, the composite effect of stress concentration relaxation and residual tensile stress relaxation becomes further effective.

Also, in the fillet weld joint in relation with an embodiment of the present invention, a sheet thickness of a base metal subjected to the arc welding may be 6 mm or below.

According to such constitution, if the toe radius ρ is same, as the sheet thickness t is less, the stress concentration effect is eliminated, and therefore the stress concentration effect is easily eliminated by making the sheet thickness 6 mm or below.

The method for gas shielded arc welding in relation with an embodiment of the present invention is a method for gas shielded arc welding using the flux-cored wire described above in which pure Ar gas is used as a shielding gas, and a pulse waveform is employed as a current or voltage waveform of a power source.

According to such method for welding, because pure Ar gas is used as a shielding gas and the wire described above is used as a wire, a toe radius ρ of a toe part of welding increases, the hardening performance and the wettability between the base metal and the weld bead are improved, and occurrence of solidification cracking is suppressed. Also, the arc stability is not impeded, the bead shape becomes normal, and the stress concentration is relaxed also. Further, because a pulse waveform is employed, orderly droplet detachment is achieved. Due to these actions, the weld metal comes to have predetermined values of the Ms point and ρ/t, and these values come to satisfy the predetermined relation.

Because the fatigue strength of the fillet weld joint in relation with an embodiment of the present invention is high, the lifetime of a manufactured object that is fillet-welded can be extended. Further, because it is not necessary to contain a large amount of an expensive alloy element such as Ni and the like which were required to significantly lower the Ms point in the past, it is excellent in cost reduction also.

According to the method for gas shielded arc welding in relation with an embodiment of the present invention, by stipulating the welding wire composition and shielding gas composition and combining a welding current waveform therewith, the fatigue strength of the joint significantly improves, and thereby the lifetime of a manufactured object that is fillet-welded can be extended. Also, welding cracking such as delayed cracking and solidification cracking does not occur. Further, because it is not necessary to contain a large amount of an expensive alloy element such as Ni and the like, it is excellent in cost reduction also.

BRIEF DESCRIPTION OF THE DRAWINGS

FIG. 4A is a perspective view, and FIG. 4B is a cross-sectional view taken along the line A-A in FIG. 4A.

FIG. 6A is a top view of the specimen and FIG. 6B is a side view of the specimen.

DESCRIPTION OF THE PREFERRED EMBODIMENTS

Figure 1:
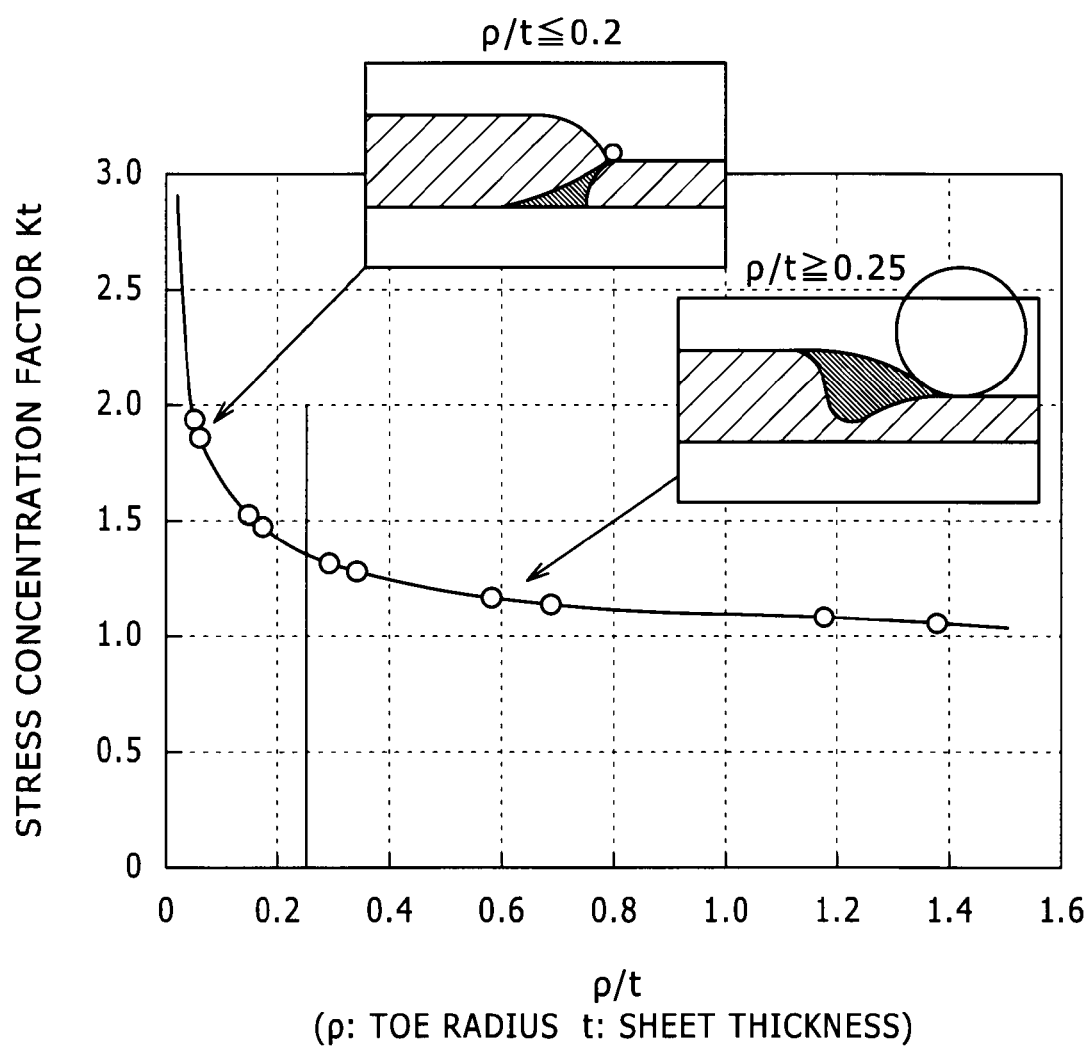
FIG. 1 is a graph showing the relation between ρ/t and a stress concentration factor Kt in a lap fillet weld joint.

Below, embodiments of the present invention will be described in detail.

First, the philosophy of the fillet weld joint and the method for gas shielded arc welding in relation with the present invention which have been completed by the present inventors will be described referring to FIGS. 1, 2 and 3A-3C.

In general, the stress concentration factor has a mutually opposite relation with respect to the ratio ρ/t of the toe radius ρ and the sheet thickness t. For example, as the toe radius ρ increases, the stress concentration factor decreases, or in other words, stress concentration is relaxed. This relation was checked by an experiment, and the result shown in FIG. 1 was obtained. The result shows that, in the region where ρ/t is 0.20 or below, the stress concentration factor extremely increases, and the fatigue strength extremely lowers. It was clarified that, according to a common method for gas shielded arc welding using $CO_2$ gas and gas mixture of Ar and $CO_2$ (may be hereinafter referred to as "Ar+$CO_2$"), the toe radius ρ could be improved only in the region where ρ/t was 0 or above and 0.20 or below even if any measure studied so far was taken, and therefore the fatigue strength improving effect was not significant.

On the other hand, in the region where ρ/t is 0.25 or above, the change of the stress concentration factor is dull against the change of ρ/t, and the stress concentration factor becomes a value near to 1.0 which is the stress concentration factor of a flat plate. Accordingly, if improvement of ρ/t can be effected to reach to the region, it can be expected that stress concentration is significantly relaxed and the fatigue strength is improved.

With regard to the influence of a tensile residual stress that is another cause of lowering the fatigue strength, as has been reported so far in a number of documents, it is no doubt that the tensile residual stress affects the fatigue strength. Because there has not been any means for improving the fatigue strength by improving a toe shape so far, a means utilizing volume expansion phase transformation at the maximum in which tension changes to compression in cooling at room temperature has been proposed. However, the expansion transformation, that is a martensitic transformation, has a property of highly hard and embrittled, and is well known as a metal structure most liable to cause the delayed cracking due to hydrogen. Here, the hardness of the weld metal is correlated to the martensitic transformation starting temperature (Ms point), and as the Ms point is lower, the hardness becomes high. Also, as the hardness is higher, the delayed cracking sensibility rises, and absorbed energy lowers as well. In other words, the weld metal with low Ms point is less practical from the viewpoints of the delayed cracking resistance and toughness.

From these reasons, it was concluded that a weld joint improved in fatigue strength and highly practical was to be achieved most preferably by a hybrid (composite) action combining reduction of a tensile residual stress by lowering the Ms point to a range not causing delayed cracking without preheating and a stress concentration relaxation effect by improving a toe shape for the purpose of making up insufficiency of fatigue strength improvement. Also, if it is not necessary to lower the Ms point excessively, an expensive alloy is not required, and therefore practicality further increases in terms of the cost.

More specifically, the Ms point of the weld metal should be 400° C. or above. When the Ms point is 400° C. or above, near to bainitic transformation which is expansion transformation to some degree or to martensitic transformation in a low strain range is needed only, the delayed cracking sensibility does not rise, and possibility of causing cracking can be ignored even if the environment of usage after welding is taken into consideration. Further, absorbed energy is within a practical range also. On the other hand, when the Ms point exceeds 550° C., expansion transformation is not caused essentially, and a compressive residual stress of a toe part cannot be expected. Also, even if stress concentration is relaxed, great fatigue strength improvement does not result only by a single effect of stress concentration relaxation.

Figure 2:
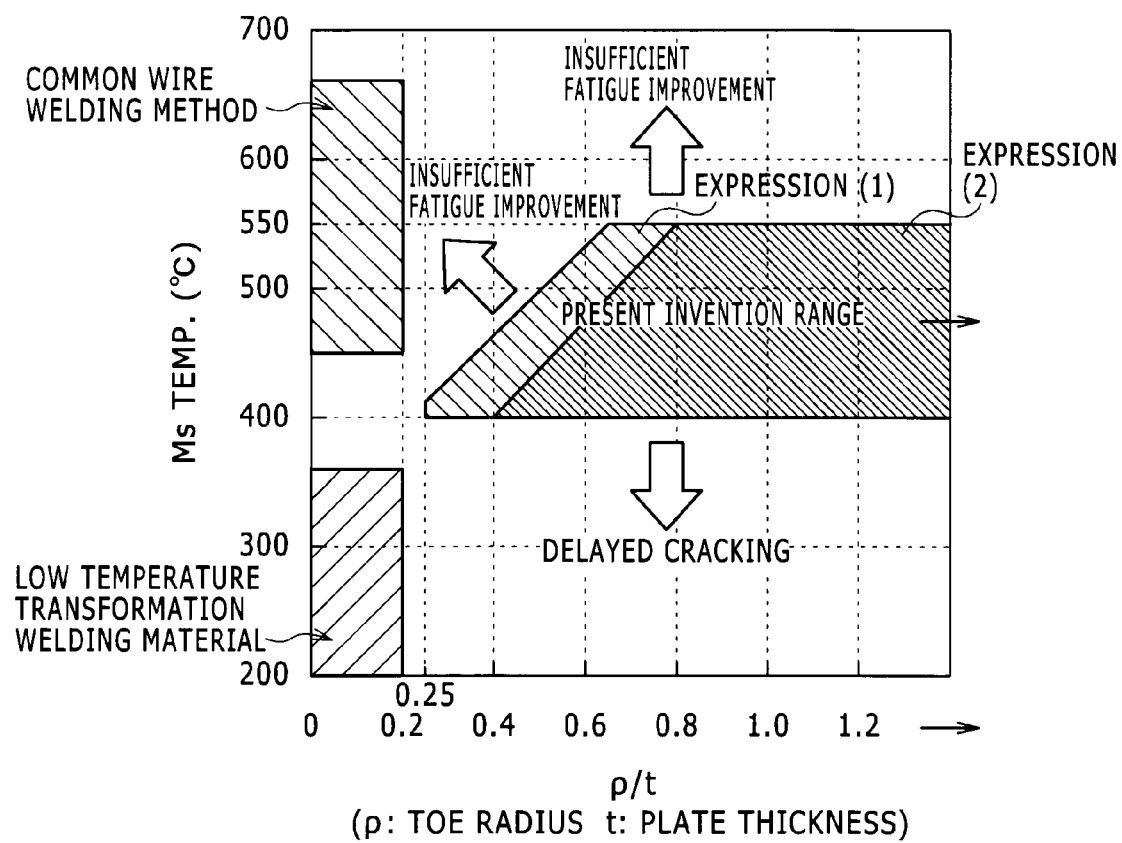
FIG. 2 is a graph comparing the range according to the present invention and the range according to prior arts with respect to ρ/t and the Ms point.

Also, in the range according to an embodiment of the present invention, in a region where ρ/t is comparatively low, the composite effect by imparting a compressive residual stress by lowering the Ms point is necessary at the maximum, and therefore a correlation region by a linear expression is arranged. More specifically, "Ms(° C.)≤375×[ρ/t]+320 . . . (1)" should be satisfied. Also, if "Ms(° C.)≤375×[ρ/t]+250 . . . (2)" is satisfied, it is more preferable. The relation between the Ms point and the linear expression is shown in FIG. 2. Further, in FIG. 2, the range of the expression (1) includes the range of the expression (2). In the region constituted by the toe shape and the Ms point, there has not been any innovative means for improving the toe radius so far, and therefore there has not been any practical means. However, the present inventors have developed a practical method for arc welding capable of satisfying the region.

Figure 3C:
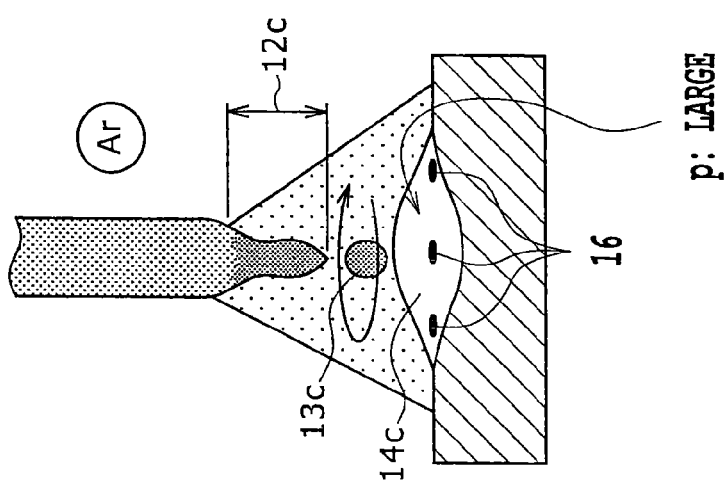
FIGS. 3A-3C are drawings explaining transfer of droplets in gas shielded arc welding and are schematic views showing a cross-section of the weld beads.

Next, transfer of droplets in gas shielded arc welding will be described referring to FIGS. 3A-3C. FIG. 3A is a schematic view showing transfer of droplets and the bead shape in a case of combining a conventional wire and a conventional shielding gas, FIG. 3B is a schematic view showing transfer of droplets and the bead shape in a case of combining a conventional wire and pure Ar shielding gas, and FIG. 3C is a schematic view showing transfer of droplets and the bead shape in a case of combining a wire stipulated in an embodiment of the present invention and pure Ar shielding gas.

In common methods for gas shielded arc welding, oxidizing gas such as $CO_2$ and $Ar+CO_2$ is used as a shielding gas. This is applicable also to all of the preceding technical documents described above. The reason is that, as shown in FIG. 3A, an endothermic reaction caused in thermal dissociation of the oxidizing gas in an arc 11a has actions of making the arc 11a shrink, acting as a so-called pinching force, narrowing and cutting a molten part of the tip of a wire (may be hereinafter referred to as "wire tip droplet part) 12a, and stably transferring the arc 11a. Thus, the arc 11a has stiffness, the arc 11a is concentrated to a constant narrow region, and deep welding penetration and stable transfer of droplets are achieved (refer to droplets 13a). However, according to the research by the present inventors, it was found out that this concentration of the arc 11a and the location of transfer of droplets was, at the same time, a demerit of becoming the causes for that the bead shape became convex and the wettability of the toe part lowered (refer to a molten pool 14a).

As a result of carrying out the research on that, a practical means was invented in which an excellent bead toe shape with 0.25 or above ρ/t which had not been achieved in the past could be obtained by combining a flux-cored wire stipulated in the present invention, a shielding gas of pure Ar composition which had been deemed not to be suitable to a method for gas metal gas shielded arc welding in the past, and a pulsed power source.

Figure 3B:
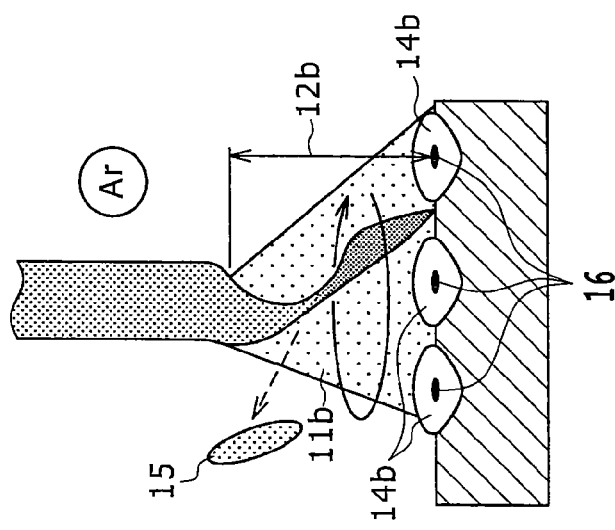
Figure 3A:
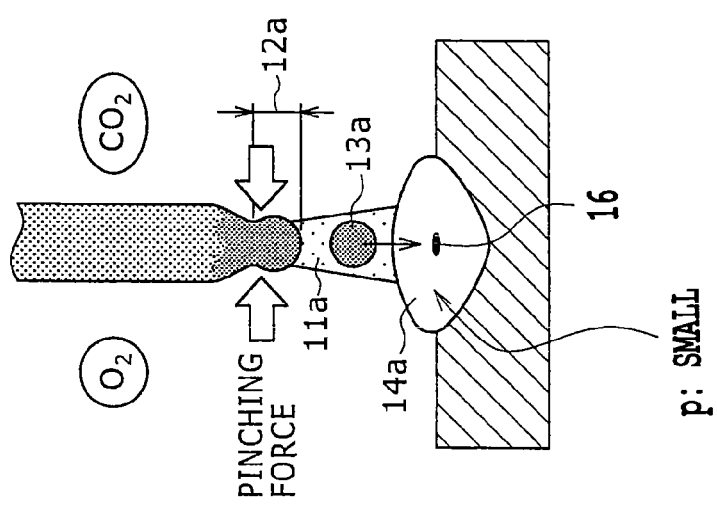

As shown in FIG. 3B, in general, when pure Ar is used as a shielding gas, the pinching force is not generated, and therefore it becomes impossible to cut a wire tip droplet part 12b and transfer it to a molten pool 14b. Therefore, an arc 11b is extremely unstable and a normal weld bead cannot be formed (refer to the molten pool 14b). Further, spatters 15 are generated also.

However, it was found out that, as shown in FIG. 3C, only in a flux-cored wire stipulated in the present invention whose chemical composition, oxide amount, flux rate and the like were stipulated, extension of a wire tip molten part 12c was prevented, transfer of droplets 13c to a molten pool 14c was allowed, and moderate instability of a base metal side arc generation point accompanying absence of a base metal side negative pole point 16, with an oxide being generally a base point thereof, had an action of widening a molten pool 14b in a groundbreaking manner. Thus, the wettability of the toe part can be improved, and the toe radius .rho. can be increased dramatically. Also, the pulsed power source has an effect of improving the arc stability regardless of a current zone, and contributes to improving and stabilizing the shape of the toe part eventually.

Thus, by optimally adjusting the chemical composition of a welding wire and combining Ar shielding gas and a pulsed power source in order to make the Ms point of a weld metal appropriate, simultaneous control of a residual stress and stress concentration to a toe part which had not been able to be achieved before was allowed.

Below, the fillet weld joint and the method for gas shielded arc welding according to the present invention will be described.

Fillet Weld Joint

First Embodiment

The fillet weld joint according to the first embodiment of the present invention is a fillet weld joint of steel formed by arc welding in which a martensitic transformation starting temperature (Ms point) of a weld metal is 400° C. or above and 550° C. or below, a value obtained by dividing a toe radius ρ of a toe part of welding by the sheet thickness t of a base metal (ρ/t), that is, the ratio ρ/t of the toe radius ρ and the sheet thickness t of the base metal, is 0.25 or above, an expression below $$Ms(° C.) \leq 375 \times [\rho/t] + 320 \quad (1)$$

is satisfied, and a crack defect does not exist.

Below, each constitution will be described.
<Ms Point: 400° C. or Above and 550° C. or Below>

As the Ms point of the weld metal is lower, expansion transformation is generated at a temperature near to room temperature, and a tensile residual stress is offset and lowers. As a result, a compressive residual stress is generated and the fatigue strength is improved. This action is not effected unless the Ms point is 550° C. or below. On the other hand, as the Ms point is lower, a compressive residual stress increases, however a martensitic structure with a large strain is promoted and cracking occurs which is not practical. Also, Charpy absorbed energy lowers and the resistance to impact deteriorates. According to the present invention, because relaxation of stress concentration by improving a toe shape effectively works, it is not required to make the Ms point excessively low, and the lower limit is set 400° C. at which the weld metal that has not any problem with respect to the cracking resistance and toughness in general construction is formed.

Here, the Ms point can be calculated, for example, by cutting out a specimen for measuring the Ms point from the center part of a cross-section of the weld metal and measuring the Ms point of the specimen by a Ms point measuring apparatus.
<ρ/t: 0.25 or Above>

The stress concentration factor representing the degree of stress concentration is inversely proportional to the ratio ρ/t of a toe radius ρ and the sheet thickness t of the base metal. That is, in a toe of welding with a constant toe radius ρ, there is a tendency that, as the sheet thickness decreases, ρ/t increases and stress concentration is relaxed more, whereas as the sheet thickness increases, ρ/t lowers, a stress is concentrated more, and the fatigue strength lowers. In the residual stress region of a toe part of welding by the Ms point of the stipulated range according to the present invention, when ρ/t is 0.25 or above, lowering of the fatigue strength due to stress concentration can be significantly improved. Therefore, ρ/t is to be 0.25 or above.

Here, the toe radius ρ can be calculated by, for example, orthogonally cutting the center part in the longitudinal direction of the bead after welding to manufacture a cross-sectional macro test piece, thereafter enlarging a so-called toe part which is a meeting part of the surface of the weld metal and the surface of the base metal by an optical microscope, fitting a periphery of a circle, and defining the radius thereof as the toe radius ρ.
<Ms(° C.)≤375×[ρ/t]+320>

As described above, it is necessary for the present object to satisfy both the Ms point and ρ/t, however the composite effect of them is insufficient in the range on the lower limit side of ρ/t and the upper limit side of the Ms point, and therefore it is necessary to arrange a predetermined limit on the relation of the Ms point and ρ/t. With respect to the limit, if the relation of the expression below $$Ms(° C.) \leq 375 \times [\rho/t] + 320 \quad (1)$$

including both of these parameters is satisfied, the composite effect of stress concentration relaxation and residual tensile stress relaxation becomes effective. That is, the fatigue strength is improved.

Also, in order to improve the effect further, it is preferable that the intercept of the expression (1) is reduced as "+250" and the expression below $$Ms(° C.) \leq 375 \times [\rho/t] + 250 \quad (2)$$

is applied.

Further, it is preferable that the sheet thickness of the base metal subjected to arc welding is 6 mm or below.
<Sheet Thickness of Base Metal: 6 mm or Below>

The ratio ρ/t of a toe radius ρ and the sheet thickness t is correlated to the stress concentration factor, and the mechanism is as described above in which, as the value is larger, the stress concentration factor comes close to 1, that is a flat plane, and the stress concentration effect is eliminated. Further, the measure to increase the toe radius ρ by a welding method is as described above also, however it is obvious that, when the toe radius ρ is same, the smaller the sheet thickness t is, the more effective the present invention becomes. In other words, as the sheet thickness is less, the fatigue strength improving effect of the present invention is enhanced. Also, when the sheet thickness is 6 mm or below, the effect becomes significant by combination with the improving range of the toe radius ρ according to the present invention. Therefore, it is preferable that the sheet thickness is 6 mm or below.

Second Embodiment

The fillet weld joint according to the second embodiment of the present invention is a fillet weld joint of steel formed by arc welding using pure Ar gas as a shielding gas and using a flux-cored wire as a wire in which the wire uses a steel hoop or a steel pipe as a sheath, contains, in terms of the total mass of the wire, C, Si, Mn, P, S by a predetermined amount, and suppresses total oxides to a predetermined amount or below. Also, a mass ratio of total flux with respect to the wire is stipulated. Further, the fillet weld joint is formed employing a pulse waveform as a current or voltage waveform of a power source, and is free from a crack defect.

Also, the wire may contain, in terms of the total mass of the wire, a total of Ti, Zr, Al and Mg (Ti+Zr+Al+Mg) by a predetermined amount, and may contain one or more element out of Ni, Cr, Mo by a predetermined amount.

Below, each constitution will be described.
<Shielding Gas: Pure Ar>

As one of the essential conditions of a method for welding forming the construction of the fillet weld joint according to the present invention, the shielding gas in welding should be pure Ar. By using pure Ar which was not used for iron-based gas metal welding method in the past, when compared with a common shielding gas added with oxidizing gas, a toe shape of the bead can be made flat, or the toe radius ρ can be increased, dramatically. With a shielding gas using oxidizing gas, the toe radius ρ cannot be improved.

Further, the expression "pure Ar" in the present invention does not mean mathematical 100 vol % Ar, but pure Ar as an industrial product. In this connection, Ar for industrial use is stipulated in JIS K1105, which reads class 1 as 99.99 vol % or above purity, whereas class 2 as 99.90 vol % or above purity, and both of them can be used without any problem as a combination with welding in relation with the present invention.

<Wire Form: Flux-Cored Wire with Steel Hoop or Steel Pipe Sheath>

In order to allow welding with pure Ar gas, the construction of the welding wire obtaining the fillet weld joint according to the present invention should be a flux-cored wire instead of a solid wire. However, the construction as a flux-cored wire is same with that of the conventional one. Even if a solid wire is used, the toe radius ρ cannot be increased, ρ/t decreases, and the stress concentration improving effect cannot be secured. As a method for manufacturing a flux-cored wire, there are a method of scattering flux on a steel hoop in the longitudinal direction, forming thereafter into a circular cross-section so as to be enclosed, and being drawn, and a method of filling a large diameter steel pipe with flux and being drawn. Because both of the methods do not affect the present invention, the welding wire can be manufactured by either method. Also, although there are one with a seam and one without a seam, either one can be used. With regard to the composition of the sheath, it is not necessary to stipulate by any means, however it is common to use the material of mild steel from the viewpoint of the cost and drawability. Further, although copper plating is performed on the surface in some cases, presence/absence of plating is not important.

<C: 0.08-0.32 Mass %>

C is an element having effects of lowering the Ms point and improving the quenchability. In order to lower the Ms point to 550° C. which is the upper limit in the present invention, 0.08 mass % or above is required. On the other hand, as the C content increases, the Ms point lowers, however the hardness rises and delayed cracking is liable to occur. Further, because the solid-liquid coexisting temperature zone in a phase transformation diagram expands, solidification cracking is liable to occur also. Furthermore, the toughness lowers as well. As the Ms point not causing delayed cracking, the lower limit is stipulated 400° C. according to the present invention, however in order to achieve it, to prevent hot cracking, and to secure the toughness, C content should be suppressed to 0.32 mass % or below. Also, from the viewpoint of the hot cracking resistance and the toughness, it is more preferable to make it 0.25 mass % or below.

<Si: 0.40-3.00 Mass %>

Si is an element having the functions of lowering the surface tension of the molten pool and improving the wettability between the base metal and the weld bead. In order to improve stress concentration in the toe part, 0.40 mass % or above is required. On the other hand, when Si content exceeds 3.00 mass %, viscosity of the molten pool rises, and the wettabiity is deteriorated adversely. Also, the toughness lowers as well. Therefore, Si content should be suppressed to 3.00 mass % or below.

<Mn: 1.00-5.00 Mass %>

Mn is an element having effects of lowering the Ms point and improving the quenchability. In order to lower the Ms point to 550° C. which is the upper limit in the present invention, 1.00 mass % or above is required. On the other hand, as the Mn content increases, the Ms point lowers, however the hardness rises and delayed cracking is liable to occur. Also, the toughness lowers as well. As the Ms point not causing delayed cracking, the lower limit is stipulated 400° C. according to the present invention, however in order to achieve it and to secure the toughness, Mn content should be suppressed to 5.00 mass % or below.

<P, S: 0.030 Mass % or Below Respectively>

Both of P, S are elements liable to cause solidification cracking. In general, it is not necessary to add them on purpose. However, containment of them by 0.030 mass % or below respectively does not cause a problem practically, and therefore 0.030 mass % is made the allowable upper limit respectively. Also, because S has functions of lowering the surface tension and improving the wettability between the base metal and the weld bead, it is more preferable to be controlled to 0.007 mass % or above.

<Total of Oxides: 1.0 Mass % or Below (Inclusive of 0%)>

In many common flux-cored wires for an oxidizing gas, a metal oxide such as $TiO_x$, $SiO_x$, $MnO_x$, $ZrO_x$, $MgO_x$ (x is a number) is positively added for the purpose such as softening an arc, improving the slag removability, and securing the slag thickness. However, the flux-cored wire required for obtaining the fillet weld joint according to the present invention should be optimized for pure Ar gas combined, and existence of the oxide impedes the arc stability adversely in pure Ar atmosphere. As a result, a normal bead shape cannot be obtained, and the effect of relaxing stress concentration cannot be secured as well. Therefore, the oxide is preferable to be as little as possible. When the total of the oxides is 1.0 mass % or below, adverse effect is not significant, and therefore 1.0 mass % is to be the upper limit.

<Remainder of Flux: Iron Powder>

Other than the alloy elements of the flux is constituted essentially of iron powder. Also, the iron powder is defined as a powder of 95 mass % or above Fe content and 500 μm or below particle size. However, adding an alkali metal, alkaline earth metal, or a compound thereof by a minute amount for the purpose of further improving the arc stability does not become a demerit for the object of the present invention, and therefore it is allowable. Also, in the flux, inevitable impurities are included by a minute amount as the other composition. Further, the composition of the inevitable impurities does not affect the object of the present invention.

<Mass Ratio of Total Flux: 7-30 Mass %>

The mass ratio of the total flux with respect to the wire is the mass of the flux per unit length of the wire, and a smaller mass ratio of the total flux means that the exclusive area of the flux in the center part of a cross-sectional area is narrower. In order to stabilize an arc adequately in pure Ar shielding gas, dual construction of a flux and a sheath steel is required, however when the mass ratio of the total flux is below 7 mass %, the effect of the dual construction is lost essentially, the entire cross-section is molten uniformly in a same manner as a solid wire, the molten part of the tip of the wire becomes slender, and both of transfer of droplets and the bead shape become unstable. In order to shorten the molten part of the tip of the wire, the mass ratio of the total flux should be 7 mass % or above. On the other hand, when it exceeds 30 mass %, the sheath steel becomes thin, not only manufacturing as a wire becomes difficult, but also the sheath steel where the current flows is heated extremely excessively, only the sheath steel is molten in a part above the arc, thereby proper stage melting cannot be performed also, and the arc becomes unstable. Therefore, the upper limit of the mass ratio of the total flux with respect to the wire is to be 30 mass %.

<Current or Voltage Waveform of Power Source: Pulse Waveform>

In a method for pulse welding, by imparting a pinching force constantly using an action of a high current zone regardless of an average current, orderly droplets detachment can be achieved. In a pure Ar gas welding method in which the thermal pinching force by thermal dissociation of oxidizing gas cannot be secured, increase of the pinching force by a current waveform is especially required. Unless transfer of droplets is orderly, an adverse effect is exerted on the bead shape, and stress concentration cannot be improved eventually. In order to obtain the toe shape stipulated in the present invention, the pulse waveform is essential. Setting of the pulse is not particularly limited, however the condition commonly employed is peak current: 350-600 A, base current: 30-100 A, duration of 1 peak (from the start of rise, through a stationary period of the peak, until the end of rise): 0.8-5.0 msec.

<Ti+Zr+Al+Mg: 0.80 Mass % or Below>

Ti, Zr, Al, Mg are elements increasing the surface tension of the droplets, shortening the length of the molten part of the tip of the wire, and improving the arc stability in the pure Ar gas atmosphere. These elements are used as a flux in the forms such as the metal itself (for example, Ti, Zr, Al, Mg), an iron alloy thereof (for example, ferrotitanium, ferrozirconium, ferroaluminum), and their alloys (for example, aluminum-magnesium alloy). Also, as described above, adding as an oxide is not preferable. Whichever form it may be, the arc stability is improved by positive addition by 0.80 mass % or below in terms of the total of Ti, Zr, Al, Mg, however when it exceeds 0.80 mass %, it is excessive, the wettability in the toe part of welding deteriorates, and improvement of stress concentration is impeded. Therefore, when Ti+Zr+Al+Mg is to be added, the total of 0.80 mass % is the upper limit.

<Ni, Cr, Mo: 3.0 Mass % or Below Respectively>

Ni, Cr, Mo are elements having effects of lowering the Ms point and improving the quenchability. Even when they are not added, the Ms point can be lowered to 550° C. which is the upper limit in the present invention, however they can substitute for a part of elements improving the quenchability such as C and Mn. However, as respective contents are increased, the Ms point lowers, but the hardness rises and delayed cracking is liable to occur. Further, the toughness lowers also. As the Ms point at which delayed cracking is not caused, the lower limit is stipulated 400° C. according to the present invention, however in order to achieve it and to secure the toughness, the content should be suppressed to 3.0 mass % or below respectively when they are to be contained.

Further, it is preferable that the sheet thickness of the base metal subjected to arc welding is 6 mm or below. Description on the sheet thickness is same as described in the first embodiment, and therefore the description is omitted here.

Third Embodiment

The fillet weld joint according to the third embodiment of the present invention is a fillet weld joint of steel formed by arc welding using pure Ar gas as a shielding gas and using a flux-cored wire as a wire in which the wire uses a steel hoop or a steel pipe as a sheath, contains, in terms of the total mass of the wire, C, Si, Mn, P, S by a predetermined amount, and suppresses total oxides to a predetermined amount or below. Also, a mass ratio of total flux with respect to the wire is stipulated. Further, the fillet weld joint is formed employing a pulse waveform as a current or voltage waveform of a power source.

Also, a martensitic transformation starting temperature (Ms point) of a weld metal is 400° C. or above and 550° C. or below, a value obtained by dividing a toe radius ρ of a toe part of welding by the sheet thickness t of a base metal (ρ/t), that is, the ratio ρ/t of the toe radius ρ and the sheet thickness t of the base metal, is 0.25 or above, an expression below $$Ms(° C.) \leq 375 \times [\rho/t] + 320 \quad (1)$$

is satisfied, and a crack defect does not exist. In addition, it is more preferable that the expression (1) is substituted by $$Ms(° C.) \leq 375 \times [\rho/t] + 250 \quad (2)$$

Also, the wire may contain, in terms of the total mass of the wire, a total of Ti, Zr, Al and Mg (Ti+Zr+Al+Mg) by a predetermined amount, and may contain one or more element out of Ni, Cr, Mo by a predetermined amount.

Further, it is preferable that the sheet thickness of the base metal subjected to arc welding is 6 mm or below. Respective constitutions of the third embodiment are same as described in the first embodiment and the second embodiment, and therefore the description is omitted here.

Method for Gas Shielded Arc Welding

The method for gas shielded arc welding according to the present invention is a method for gas shielded arc welding using the flux-cored wire described above, uses pure Ar gas as a shielding gas, and employs a pulse waveform as a current or voltage waveform of a power source.

In other words, a fillet weld joint formed by welding using pure Ar gas as a shielding gas, using the flux-cored wire described above as a wire, and employing the pulse waveform described above as a current or voltage waveform of a power source becomes the fillet weld joint according to the present invention described above. That is, by this method for gas shielded arc welding, the fillet weld joint of the first embodiment, the second embodiment and the third embodiment can be obtained.

Also, pure Ar gas, a flux-cored wire and a pulse waveform used in the present method for welding are same with the description above, and therefore the description will be omitted here.

As described above, the fillet weld joint and the method for gas shielded arc welding according to the present invention can improve the fatigue strength of the joint by improving the stress concentration dramatically without excessively relying on imparting a compressive residual stress to a toe part by welding material, that is, by simultaneously improving control of a residual stress and a toe shape, can eliminate the risk such as delayed cracking and the like and lowering of absorbed energy, and can achieve high efficiency, low risk and low cost.

In other words, when the toe shape of the bead is dramatically improved by stipulating the welding wire composition and the shielding gas composition and combining the welding current waveform thereto, the Ms point affecting the tensile residual stress is adjusted properly, and the sheet thickness is satisfied, the fatigue strength of the joint greatly improves and the lifetime of the manufactured object can be extended. Also, a groundbreaking effect that the risk of causing welding cracking caused by lowering the Ms point to near a room temperature which is a method of a prior art is eliminated can be obtained. Furthermore, because it is not necessary to contain a large amount of expensive alloy elements such as Ni and the like which are required for largely lowering the Ms point, the technology is practical in the cost as well.

EXAMPLE

Next, the fillet weld joint and the method for gas shielded arc welding according to the present invention will be described in detail comparing the examples satisfying the requirement of the present invention and the comparative examples not satisfying the requirement of the present invention.

First Example

The first example relates to a fillet weld joint in relation with the first embodiment.

Figure 4A:
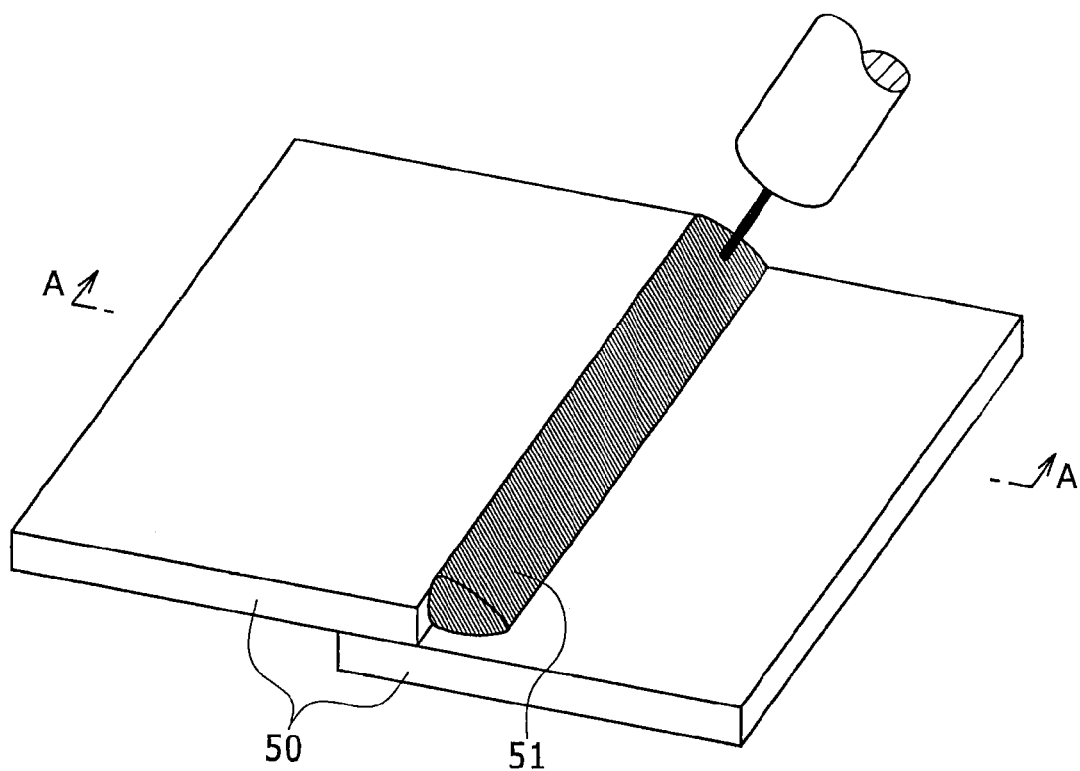
FIGS. 4A and 4B are schematic views explaining the condition of lap fillet welding according to an example.
Figure 4B:
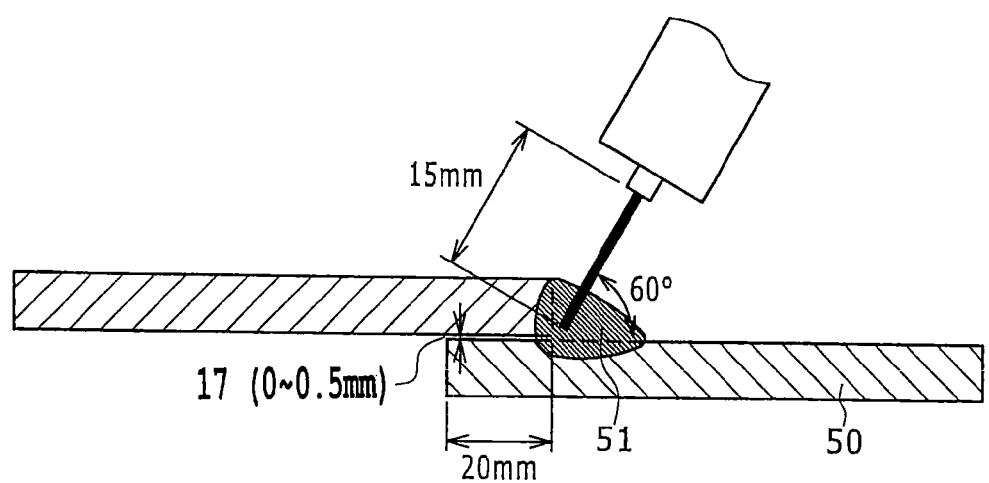

As shown in FIGS. 4A and 4B, the steel sheets 50 were the base metals in which the sheet thickness was changed according to the sample and were subjected to lap fillet welding with each other via weld metal 51 and having a root gap 17, and items described below were confirmed.

The welding condition was as follows.
Wire diameter: 1.2 mm
Shielding gas flow rate: 20 l/min
Torch proceeding/receding angle: none (that is, orthogonal to the welding direction)
Welding current, welding voltage, welding speed: optimum value according to the sheet thickness (here, the leg of a fillet weld on the vertical sheet side should reach the upper sheet)

The composition of the base metal and the tensile strength are shown in Table 1. Also, the composition of the sheath of the flux-cored wire is shown in Table 2, and the wire form, componential composition of the wire, shielding gas composition, condition of the power source, and arc stability are shown in Tables 3-5. Here, with regard to the wire form, Nos. 48, 49, 55, 58, 61 are those using the solid wire (described as "Solid" in the table), and the composition of the solid wire is described in the column of the componential composition. Others are those using the flux-cored wire (described as "FCW" in the table). Also, "-" in Tables 3-5 means one not containing the composition or one in which the value does not exist, and those not satisfying the predetermined range are shown by underlining the value and the like. Further, Ar gas in accordance with JIS K1105 is used for pure Ar, and is described as "Ar 100%" in Tables.

TABLE 1

| Componential composition (mass %) (Remainder: Fe and inevitable impurities) | | | | | |
|---|---|---|---|---|---|
| C | Si | Mn | P | S | Tensile strength |
| 0.06 | 0.98 | 1.45 | 0.005 | 0.002 | 795 MPa |

TABLE 2

| Componential composition (mass %) (Remainder: Fe and inevitable impurities) | | | | | | |
|---|---|---|---|---|---|---|
| C | Si | Mn | P | S | Cr | Ti |
| 0.01 | 0.01 | 0.22 | 0.008 | 0.005 | <0.01 | <0.01 |

TABLE 3

| Kind | No. | Wire form | Componential composition (mass %) (Remainder: Fe and inevitable impurities) | | | | | | | | | | | Mass ratio of flux | Shielding gas composition (% represents vol %) | Power source condition | | | Arc stability |
|---|---|---|---|---|---|---|---|---|---|---|---|---|---|---|---|---|---|---|---|
| | | | C | Si | Mn | P | S | Total of oxide | Ti + Al + Zr + Mg | Mo | Cr | Ni | | | Waveform | Peak current (A) | Base current (A) | |
| Example | 1 | FCW | 0.25 | 0.90 | 1.60 | 0.010 | 0.010 | — | Ti:0.20 | — | — | — | 15 | Ar100% | Pulse | 460 | 80 | Good |
| | 2 | FCW | 0.25 | 0.90 | 1.60 | 0.010 | 0.010 | — | Ti:0.20 | — | — | — | 15 | Ar100% | Pulse | 460 | 80 | Good |
| | 3 | FCW | 0.25 | 0.90 | 1.60 | 0.010 | 0.010 | — | Ti:0.20 | — | — | — | 15 | Ar100% | Pulse | 460 | 80 | Good |
| | 4 | FCW | 0.25 | 0.90 | 1.60 | 0.010 | 0.010 | — | Ti:0.20 | — | — | — | 15 | Ar100% | Pulse | 460 | 80 | Good |
| | 5 | FCW | 0.25 | 0.90 | 1.60 | 0.010 | 0.010 | — | Ti:0.20 | — | — | — | 15 | Ar100% | Pulse | 460 | 80 | Good |
| | 6 | FCW | 0.10 | 0.70 | 1.35 | 0.007 | 0.007 | — | Ti:0.10 | — | — | — | 7 | Ar100% | Pulse | 450 | 75 | Good |
| | 7 | FCW | 0.21 | 0.85 | 1.90 | 0.011 | 0.005 | — | Ti:0.20, Mg:0.1 | — | — | — | 12 | Ar100% | Pulse | 480 | 50 | Good |
| | 8 | FCW | 0.32 | 0.60 | 1.55 | 0.015 | 0.020 | — | — | — | — | — | 17 | Ar100% | Pulse | 460 | 70 | Good |
| | 9 | FCW | 0.08 | 1.10 | 2.00 | 0.007 | 0.006 | — | Ti:0.75 | — | — | — | 18 | Ar100% | Pulse | 450 | 75 | Good |
| | 10 | FCW | 0.09 | 0.50 | 1.20 | 0.006 | 0.008 | — | Ti:0.50 | — | — | 1.2 | 25 | Ar100% | Pulse | 470 | 60 | Good |
| | 11 | FCW | 0.20 | 0.90 | 1.60 | 0.010 | 0.010 | — | Ti:0.20 | — | — | — | 15 | Ar100% | Pulse | 460 | 80 | Good |
| | 12 | FCW | 0.15 | 0.90 | 1.60 | 0.010 | 0.010 | — | Ti:0.20 | — | — | — | 15 | Ar100% | Pulse | 460 | 80 | Good |
| | 13 | FCW | 0.10 | 0.90 | 1.60 | 0.010 | 0.010 | — | Ti:0.20 | — | — | — | 15 | Ar100% | Pulse | 460 | 80 | Good |
| | 14 | FCW | 0.20 | 0.90 | 1.60 | 0.010 | 0.010 | — | Ti:0.20 | — | — | — | 15 | Ar100% | Pulse | 460 | 80 | Good |
| | 15 | FCW | 0.08 | 1.50 | 1.70 | 0.012 | 0.012 | 0.70 | Zr:0.20 | — | — | — | 10 | Ar100% | Pulse | 480 | 75 | Good |
| | 16 | FCW | 0.11 | 1.00 | 1.00 | 0.007 | 0.007 | 0.20 | Al:0.31 | 0.2 | — | 2.0 | 22 | Ar100% | Pulse | 460 | 50 | Good |
| | 17 | FCW | 0.23 | 0.40 | 2.20 | 0.018 | 0.002 | — | Ti:0.05 | 1.0 | 2.9 | — | 20 | Ar100% | Pulse | 455 | 60 | Good |
| | 18 | FCW | 0.08 | 2.95 | 3.50 | 0.008 | 0.008 | 1.00 | — | — | — | — | 30 | Ar100% | Pulse | 500 | 70 | Good |
| | 19 | FCW | 0.10 | 1.00 | 5.00 | 0.008 | 0.011 | — | Al:0.20, Mg:0.20 | — | — | — | 26 | Ar100% | Pulse | 470 | 60 | Good |
| | 20 | FCW | 0.09 | 1.50 | 1.50 | 0.029 | 0.009 | 0.30 | Ti:0.40, Zr:0.40 | — | — | 3.0 | 9 | Ar100% | Pulse | 520 | 75 | Good |
| | 21 | FCW | 0.12 | 0.77 | 1.26 | 0.020 | 0.030 | — | Ti:0.15 | 3.0 | — | — | 16 | Ar100% | Pulse | 570 | 60 | Good |
| | 22 | FCW | 0.15 | 0.60 | 1.15 | 0.011 | 0.010 | 0.75 | — | 1.0 | 1.0 | 1.0 | 21 | Ar100% | Pulse | 450 | 60 | Good |
| | 23 | FCW | 0.28 | 0.90 | 2.20 | 0.011 | 0.015 | — | Ti:0.40 | — | — | 2.5 | 19 | Ar100% | Pulse | 430 | 70 | Good |
| | 24 | FCW | 0.19 | 0.75 | 2.00 | 0.010 | 0.021 | — | — | — | — | — | 20 | Ar100% | Pulse | 430 | 50 | Good |

TABLE 4

| Kind | No. | Wire form | C | Si | Mn | P | S | Total of oxide | Ti + Al + Zr + Mg | Mo | Cr | Ni | Mass ratio of flux | Shielding gas composition (% represents vol %) | Waveform | Peak current (A) | Base current (A) | Arc stability |
|---|---|---|---|---|---|---|---|---|---|---|---|---|---|---|---|---|---|---|
| Comparative example | 25 | FCW | 0.10 | 0.91 | 1.58 | 0.010 | 0.007 | — | — | — | — | — | 17 | Ar100% | Pulse | 460 | 70 | Good |
| | 26 | FCW | 0.15 | 0.60 | 1.35 | 0.018 | 0.011 | 0.20 | Ti:0.11 | — | — | 0.3 | 17 | Ar100% | Pulse | 460 | 70 | Good |
| | 27 | FCW | 0.22 | 0.45 | 1.10 | 0.009 | 0.009 | 0.90 | Ti:0.25 | — | 0.5 | 1.8 | 16 | Ar100% | Pulse | 450 | 60 | Good |
| | 28 | FCW | 0.23 | 0.45 | 1.50 | 0.009 | 0.009 | 0.60 | Ti:0.21 | — | 0.5 | 1.9 | 16 | Ar100% | Pulse | 450 | 60 | Good |
| | 29 | FCW | 0.07 | 0.60 | 1.60 | 0.012 | 0.010 | 0.50 | Ti:0.10 | — | — | — | 16 | Ar100% | Pulse | 450 | 60 | Good |
| | 30 | FCW | 0.33 | 0.99 | 1.60 | 0.006 | 0.007 | — | — | — | — | — | 13 | Ar100% | Pulse | 470 | 70 | Good |
| | 31 | FCW | 0.19 | 0.35 | 1.36 | 0.017 | 0.009 | — | Ti:0.25 | — | — | 1.5 | 15 | Ar100% | Pulse | 460 | 75 | Good |
| | 32 | FCW | 0.23 | 3.10 | 1.85 | 0.006 | 0.009 | 0.77 | Ti:0.45, Al:0.15 | — | — | — | 13 | Ar100% | Pulse | 480 | 75 | Good |
| | 33 | FCW | 0.11 | 0.75 | 0.90 | 0.011 | 0.008 | 0.25 | Zr:0.25 | — | 0.5 | — | 17 | Ar100% | Pulse | 470 | 70 | Good |
| | 34 | FCW | 0.16 | 1.11 | 5.10 | 0.008 | 0.008 | — | — | — | — | — | 14 | Ar100% | Pulse | 450 | 55 | Good |
| | 35 | FCW | 0.15 | 0.90 | 1.70 | 0.012 | 0.008 | 1.10 | Ti:0.40 | — | — | 1.0 | 17 | Ar100% | Pulse | 460 | 70 | Good |
| | 36 | FCW | 0.08 | 0.90 | 2.30 | 0.013 | 0.006 | 3.40 | Ti:0.75 | — | — | — | 16 | Ar100% | Pulse | 470 | 70 | Bad |
| | 37 | FCW | 0.18 | 0.50 | 1.35 | 0.007 | 0.008 | — | Ti:0.88 | — | — | — | 14 | Ar100% | Pulse | 460 | 70 | Bad |
| | 38 | FCW | 0.27 | 0.88 | 1.88 | 0.011 | 0.015 | 0.50 | — | 3.1 | — | — | 18 | Ar100% | Pulse | 450 | 75 | Good |
| | 39 | FCW | 0.28 | 1.25 | 3.00 | 0.010 | 0.009 | 0.90 | Al:0.20, Mg:0.20 | — | 3.2 | — | 16 | Ar100% | Pulse | 480 | 70 | Good |
| | 40 | FCW | 0.23 | 0.80 | 2.15 | 0.011 | 0.010 | — | Ti:0.15 | — | — | 3.2 | 14 | Ar100% | Pulse | 440 | 60 | Good |
| | 41 | FCW | 0.25 | 0.90 | 1.60 | 0.010 | 0.010 | — | Ti:0.20 | — | — | — | 6 | Ar100% | Pulse | 460 | 80 | Bad |
| | 42 | FCW | 0.25 | 0.90 | 1.60 | 0.010 | 0.010 | — | Ti:0.20 | — | — | — | 31 | Ar100% | Pulse | 460 | 80 | Bad |

TABLE 5

| Kind | No. | Wire form | C | Si | Mn | P | S | Total of oxide | Ti + Al + Zr + Mg | Mo | Cr | Ni | Mass ratio of flux | Shielding gas composition (% represents vol %) | Waveform | Peak current (A) | Base current (A) | Arc stability |
|---|---|---|---|---|---|---|---|---|---|---|---|---|---|---|---|---|---|---|
| Comparative example | 43 | FCW | 0.25 | 0.90 | 1.60 | 0.010 | 0.010 | — | Ti:0.20 | — | — | — | 15 | Ar80% + CO$_2$20% | Pulse | 460 | 80 | Good |
| | 44 | FCW | 0.08 | 0.50 | 1.10 | 0.010 | 0.007 | — | — | — | 10.0 | 10.0 | 17 | Ar90% + CO$_2$10% | Pulse | 460 | 70 | Good |
| | 45 | FCW | 0.25 | 0.90 | 1.60 | 0.010 | 0.010 | — | Ti:0.20 | — | — | — | 15 | Ar98% + CO$_2$2% | Pulse | 460 | 80 | Good |
| | 46 | FCW | 0.25 | 0.90 | 1.60 | 0.010 | 0.010 | — | Ti:0.20 | — | — | — | 15 | CO$_2$100% | Non-pulse | — | — | Bad |
| | 47 | FCW | 0.25 | 0.90 | 1.60 | 0.010 | 0.010 | — | Ti:0.20 | — | — | — | 15 | Ar100% | Non-pulse | — | — | Bad |
| | 48 | Solid | 0.25 | 0.90 | 1.60 | 0.010 | 0.010 | — | Ti:0.20 | — | — | — | — | Ar100% | Pulse | 460 | 80 | Bad |
| | 49 | Solid | 0.25 | 0.90 | 1.60 | 0.010 | 0.010 | — | Ti:0.20 | — | — | — | — | Ar90% + CO$_2$10% | Pulse | 460 | 80 | Good |
| | 50 | FCW | 0.25 | 0.90 | 1.60 | 0.010 | 0.010 | — | Ti:0.20 | — | — | — | 15 | Ar100% | Pulse | 460 | 80 | Good |
| | 51 | FCW | 0.05 | 0.77 | 1.71 | 0.008 | 0.005 | 4.80 | Ti:0.65, Mg:0.05 | — | — | — | 17 | Ar80% + CO$_2$20% | Non-pulse | — | — | Good |
| | 52 | FCW | 0.55 | 0.90 | 1.88 | 0.010 | 0.004 | — | — | — | — | — | 15 | Ar80% + CO$_2$20% | Pulse | 470 | 60 | Good |
| | 53 | FCW | 0.25 | 0.95 | 1.55 | 0.032 | 0.010 | — | Ti:0.20 | — | 1.0 | 2.0 | 20 | Ar100% | Pulse | 450 | 55 | Good |
| | 54 | FCW | 0.20 | 0.60 | 2.21 | 0.010 | 0.032 | 0.50 | Al:0.25 | 1.0 | — | — | 18 | Ar100% | Pulse | 460 | 70 | Good |
| | 55 | Solid | 0.70 | 0.41 | 0.50 | 0.010 | 0.015 | — | — | — | — | — | — | Ar80% + CO$_2$20% | Non-pulse | — | — | Good |
| | 56 | FCW | 0.05 | 1.30 | 1.60 | 0.030 | 0.300 | — | Ti:0.29 | — | — | — | 20 | CO$_2$100% | Non-pulse | — | — | Good |
| | 57 | FCW | 0.20 | 1.00 | 10.00 | 0.005 | 0.005 | — | — | — | — | 13.1 | 17 | Ar80% + CO$_2$20% | Pulse | 460 | 80 | Good |
| | 58 | Solid | 0.02 | 0.75 | 1.93 | 0.013 | 0.006 | — | — | 0.13 | 9.31 | 9.42 | — | Ar98% + O$_2$2% | Non-pulse | — | — | Good |
| | 59 | FCW | 0.03 | 0.24 | 0.79 | 0.011 | 0.014 | — | Al:0.029, Ti:0.002 | 0.12 | 15.2 | 13.1 | 19 | None | Non-pulse | — | — | Bad |
| | 60 | FCW | 0.52 | 0.27 | 1.90 | 0.009 | 0.015 | — | — | — | — | — | 15 | Ar80% + CO$_2$20% | Non-pulse | — | — | Good |
| | 61 | Solid | 0.11 | 0.56 | 1.51 | 0.006 | 0.007 | — | Al:0.001, Ti:0.090 | — | 0.02 | 0.02 | — | Ar80% + CO$_2$20% | Non-pulse | — | — | Good |

<Arc Stability>

The arc stability was evaluated by sense in welding. The case in which welding could be conducted stably was categorized to be excellent (good), whereas the case in which the spatters were generated much, the case in which the bead shape became non-uniform, and the like was categorized to be inferior (bad).

<Ms Point>

Figure 5:
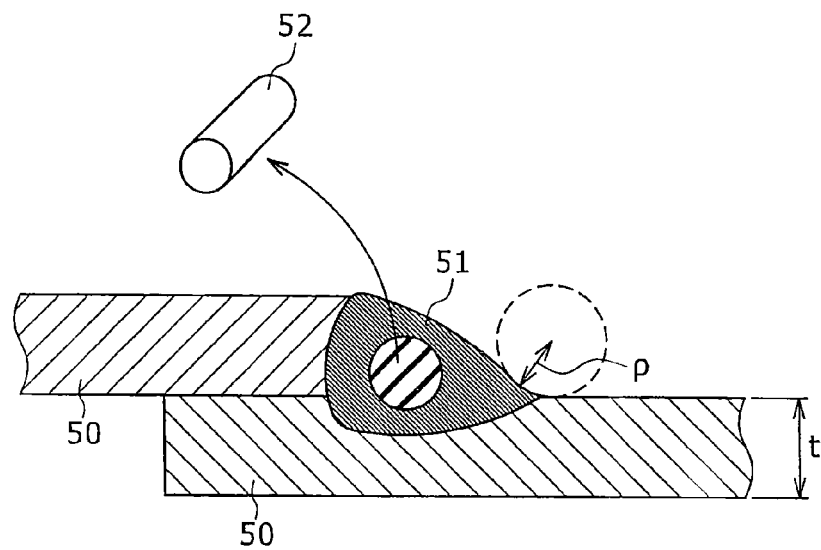
FIG. 5 is a schematic view showing a method for measuring a toe radius ρ and a procedure for obtaining a specimen for measuring the Ms point according to an example.

With respect to the Ms point of a weld metal 51 formed in the joint, a round bar with 2.5 mm diameter×10 mm length was cut out from the center part of a cross-section of the weld metal 51 as an Ms point measuring specimen 52 as shown in FIG. 5, and the Ms point of the specimen was measured by a transformation point measuring apparatus.

<Toe Radius ρ, ρ/t>

With respect to the toe radius ρ, first, the center part in the longitudinal direction of the bead after welding was cut orthogonally, then polishing and etching by acid were performed, and thereafter a cross-sectional macro test specimen was manufactured. A so-called toe part of it which is a meeting part of the surface of the weld metal and the surface of the base metal was enlarged by an optical microscope with a magnification of 10 times, a periphery of a circle was fitted as shown in FIG. 5, and the radius thereof was defined as the toe radius ρ (mm). Also, ρ/t was calculated from the toe radius ρ and the sheet thickness t.

<Expressions (1), (2) ($Y_1$, $Y_2$ in the Table)>

The expression (1) which was a relational expression of the ratio ρ/t of the toe radius ρ and the sheet thickness t and the Ms point was converted to "$Y_1=375\times[\rho/t]+320-Ms$ (° C.)" for the sake of convenience. When $Y_1$ was 0 or above, it meant that the expression (1) had been satisfied, therefore the stipulated range of the present invention was regarded to have been satisfied (◎), whereas when $Y_1$ was a minus value, the stipulated range of the present invention was regarded not to have been satisfied (x).

The expression (2) which stipulated a more preferable range was converted to "$Y_2=375\times[\rho/t]+250-Ms$ (° C.)" for the sake of convenience. When $Y_2$ was 0 or above, it meant that the expression (2) had been satisfied, therefore the preferable stipulated range of the present invention was regarded to have been satisfied (◎), whereas when $Y_2$ was a minus value, it was regarded to have satisfied the stipulated range of the present invention but the effect was slightly weaker (○). In addition, in the case $Y_1$ was a minus value, calculation of $Y_2$ was not required and was therefore omitted.

<Fatigue Strength>

Figure 6A:
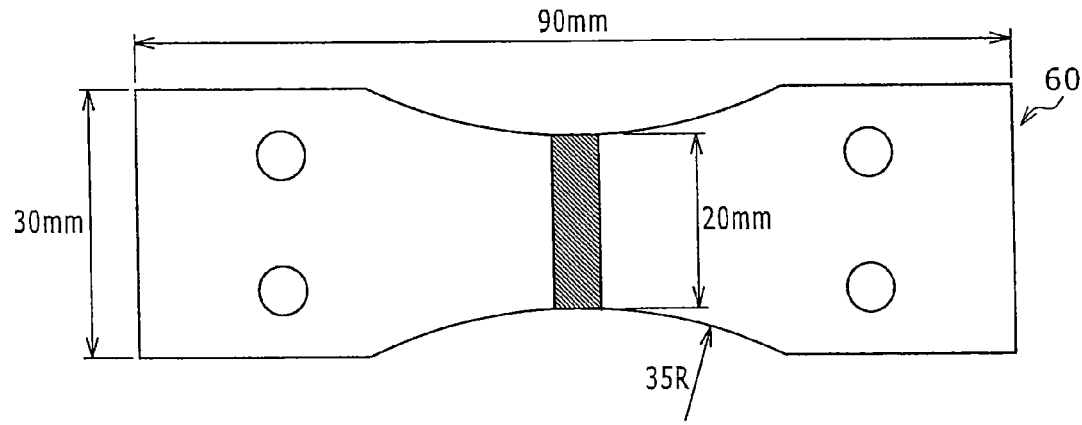
FIGS. 6A and 6B are schematic views showing the shape and size of the specimen for the fatigue test according to an example and showing the fixing direction and amplitude direction.
Figure 6B:
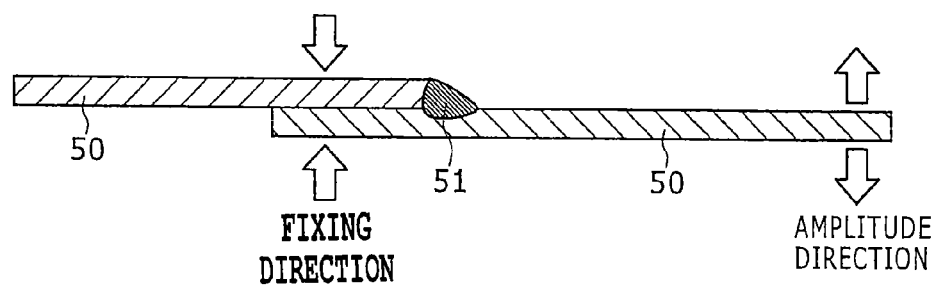

The fatigue strength was evaluated by taking a fatigue test specimen 60 shown in FIGS. 6A and 6B from a welding work and measuring the fatigue strength by a double side bending fatigue test. The double side bending fatigue test was conducted under the condition of the frequency of 25 Hz and a sinusoidal stress. Also, the strength at finite life of $10^7$ times was defined as the fatigue strength, the case of below 200 MPa was categorized not to have the effect of fatigue strength improvement and to have failed (x), the case of 200 MPa or above was categorized to have the effect and to have passed (○), whereas the case of 230 MPa or above was categorized to have the remarkable effect and to have passed (◎).

<Cracking>

Cracking was evaluated by conducting an X-ray transmission test after welding and confirming presence/absence of the cracking. Those in which occurrence of the cracking was recognized were categorized to have failed. Also, whether the cracking was delayed cracking or solidification cracking was determined by the position in the bead where the cracking occurred and observation of the fracture surface. Further, all of the joints in which the cracking occurred broke before reaching $10^7$ times in the fatigue test, and therefore the data were not available.

<Toughness>

The toughness of the weld metal was evaluated by absorbed energy in the Charpy impact test. First, separate from a lap fillet welding test, whole deposited multi-layered welding on which the case of using a flux-cored wire of JIS Z3313 or a solid wire of JIS Z3312 was used was based was conducted. Then, a Charpy impact test specimen was taken from the center part of a cross-section of the weld metal, and was subjected to the Charpy impact test. Further, the case of 47 J or above absorbed energy at −20° C. was categorized to have enough toughness and to have passed (○), whereas the case of below 47 J was categorized to be short of the toughness and to have failed (x).

The results are shown in Tables 6-8. Also, in Tables 6-8, "-" is one in which measurement and the like was not conducted or could not be obtained. Further, "ρ/t" is the value rounded off at the triple digits below the decimal point, whereas a value not rounded off was used in calculating $Y_1$, $Y_2$. Furthermore, $Y_1$, $Y_2$ are values rounded off at the single digit below the decimal point. In addition, those with a minus value of $Y_1$ will be described below as those not satisfying the expression (1).

TABLE 6

| Kind | No. | Ms point (° C.) | Toe radius ρ(mm) | Sheet thickness t(mm) | ρ/t | Judge | $Y_1$ | Judge | $Y_2$ | Judge | Fatigue strength (MPa) | Judge | Cracking Presence/ absence | Toughness Absorbed energy (J) | Judge |
|---|---|---|---|---|---|---|---|---|---|---|---|---|---|---|---|
| Example | 1 | 423 | 2.1 | 2.0 | 1.05 | ○ | 294 | ◎ | 224 | ◎ | 258 | ◎ | Absence | 86 | ○ |
| | 2 | 420 | 2.1 | 3.2 | 0.66 | ○ | 146 | ◎ | 76 | ◎ | 250 | ◎ | Absence | 86 | ○ |
| | 3 | 420 | 2.1 | 4.5 | 0.47 | ○ | 75 | ◎ | 5 | ◎ | 240 | ◎ | Absence | 86 | ○ |
| | 4 | 420 | 2.1 | 6.0 | 0.35 | ○ | 31 | ◎ | −39 | ○ | 222 | ○ | Absence | 86 | ○ |
| | 5 | 420 | 2.1 | 7.8 | 0.27 | ○ | 1 | ◎ | −69 | ○ | 202 | ○ | Absence | 86 | ○ |
| | 6 | 510 | 2.3 | 2.9 | 0.79 | ○ | 107 | ◎ | 37 | ◎ | 234 | ◎ | Absence | 116 | ○ |
| | 7 | 450 | 1.9 | 2.3 | 0.83 | ○ | 180 | ◎ | 110 | ◎ | 254 | ◎ | Absence | 98 | ○ |
| | 8 | 402 | 2.0 | 3.4 | 0.59 | ○ | 139 | ◎ | 69 | ◎ | 275 | ◎ | Absence | 49 | ○ |
| | 9 | 548 | 1.8 | 2.0 | 0.90 | ○ | 110 | ◎ | 40 | ◎ | 248 | ◎ | Absence | 134 | ○ |
| | 10 | 425 | 2.0 | 3.2 | 0.63 | ○ | 129 | ◎ | 59 | ◎ | 252 | ◎ | Absence | 130 | ○ |
| | 11 | 420 | 2.1 | 5.0 | 0.42 | ○ | 58 | ◎ | −13 | ○ | 222 | ○ | Absence | 100 | ○ |
| | 12 | 480 | 2.1 | 4.2 | 0.50 | ○ | 28 | ◎ | −43 | ○ | 227 | ○ | Absence | 106 | ○ |
| | 13 | 541 | 2.1 | 3.4 | 0.62 | ○ | 11 | ◎ | −59 | ○ | 225 | ○ | Absence | 128 | ○ |
| | 14 | 420 | 2.1 | 7.0 | 0.30 | ○ | 13 | ◎ | −58 | ○ | 220 | ○ | Absence | 100 | ○ |

TABLE 6-continued

| Kind | No. | Ms point (° C.) | Toe radius p(mm) | Sheet thickness t(mm) | p/t | Judge | $Y_1$ | Judge | $Y_2$ | Judge | Fatigue strength (MPa) | Judge | Cracking Presence/absence | Toughness Absorbed energy (J) | Judge |
|---|---|---|---|---|---|---|---|---|---|---|---|---|---|---|---|
| | 15 | 544 | 1.9 | 2.6 | 0.73 | ○ | 50 | ◎ | −20 | ○ | 217 | ○ | Absence | 96 | ○ |
| | 16 | 418 | 1.9 | 2.3 | 0.83 | ○ | 212 | ◎ | 142 | ◎ | 260 | ◎ | Absence | 76 | ○ |
| | 17 | 434 | 1.5 | 1.6 | 0.94 | ○ | 238 | ◎ | 168 | ◎ | 249 | ◎ | Absence | 58 | ○ |
| | 18 | 484 | 2.0 | 3.2 | 0.63 | ○ | 70 | ◎ | 0 | ◎ | 230 | ◎ | Absence | 51 | ○ |
| | 19 | 416 | 2.2 | 3.2 | 0.69 | ○ | 162 | ◎ | 92 | ◎ | 257 | ◎ | Absence | 50 | ○ |
| | 20 | 422 | 2.2 | 4.5 | 0.49 | ○ | 81 | ◎ | 11 | ◎ | 267 | ◎ | Absence | 53 | ○ |
| | 21 | 450 | 2.4 | 2.6 | 0.92 | ○ | 216 | ◎ | 146 | ◎ | 254 | ◎ | Absence | 54 | ○ |
| | 22 | 431 | 2.2 | 6.0 | 0.37 | ○ | 27 | ◎ | −44 | ○ | 228 | ○ | Absence | 77 | ○ |
| | 23 | 405 | 2.1 | 8.0 | 0.26 | ○ | 13 | ◎ | −57 | ○ | 224 | ○ | Absence | 88 | ○ |
| | 24 | 520 | 2.1 | 2.3 | 0.91 | ○ | 142 | ◎ | 72 | ◎ | 266 | ◎ | Absence | 102 | ○ |

TABLE 7

| Kind | No. | Ms point (° C.) | Toe radius p(mm) | Sheet thickness t(mm) | p/t | Judge | $Y_1$ | Judge | $Y_2$ | Judge | Fatigue strength (MPa) | Judge | Cracking Presence/absence | Toughness Absorbed energy (J) | Judge |
|---|---|---|---|---|---|---|---|---|---|---|---|---|---|---|---|
| Comparative example | 25 | 535 | 2.1 | 5.0 | 0.42 | ○ | −58 | x | — | — | 184 | x | Absence | 135 | ○ |
| | 26 | 500 | 2.1 | 4.5 | 0.47 | ○ | −5 | x | — | — | 190 | x | Absence | 80 | ○ |
| | 27 | 420 | 2.1 | 8.0 | 0.26 | ○ | −2 | x | — | — | 197 | x | Absence | 66 | ○ |
| | 28 | 405 | 2.1 | 9.0 | 0.23 | x | 3 | ◎ | −68 | ○ | 198 | x | Absence | 69 | ○ |
| | 29 | 560 | 2.1 | 2.3 | 0.91 | ○ | 102 | ◎ | 32 | ◎ | 192 | x | Absence | 134 | ○ |
| | 30 | 392 | 2.1 | 2.0 | 1.05 | ○ | 322 | ◎ | 252 | ◎ | — | x | Presence | 42 | x |
| | 31 | 472 | 1.5 | 4.0 | 0.38 | ○ | −11 | x | — | — | 190 | x | Absence | 99 | ○ |
| | 32 | 460 | 1.6 | 4.5 | 0.36 | ○ | −7 | x | — | — | 191 | x | Absence | 43 | x |
| | 33 | 557 | 1.9 | 3.2 | 0.59 | ○ | −14 | x | — | — | 192 | x | Absence | 66 | ○ |
| | 34 | 394 | 2.0 | 2.9 | 0.69 | ○ | 185 | ◎ | 115 | ◎ | — | x | Presence | 40 | x |
| | 35 | 504 | 0.8 | 3.4 | 0.24 | x | −96 | x | — | — | 185 | x | Absence | 101 | ○ |
| | 36 | 546 | 0.7 | 3.2 | 0.22 | x | −144 | x | — | — | 178 | x | Absence | 97 | ○ |
| | 37 | 475 | 0.9 | 4.0 | 0.23 | x | −71 | x | — | — | 190 | x | Absence | 80 | ○ |
| | 38 | 378 | 2.0 | 3.6 | 0.56 | ○ | 150 | ◎ | 80 | ◎ | — | x | Presence | 44 | x |
| | 39 | 383 | 2.1 | 2.3 | 0.91 | ○ | 279 | ◎ | 209 | ◎ | — | x | Presence | 45 | x |
| | 40 | 350 | 2.1 | 2.0 | 1.05 | ○ | 364 | ◎ | 294 | ◎ | — | x | Presence | 42 | x |
| | 41 | 420 | 0.7 | 3.2 | 0.22 | x | −18 | x | — | — | 190 | x | Absence | 86 | ○ |
| | 42 | 421 | 0.7 | 3.2 | 0.22 | x | −19 | x | — | — | 191 | x | Absence | 87 | ○ |

TABLE 8

| Kind | No. | Ms point (° C.) | Toe radius p(mm) | Sheet thickness t(mm) | p/t | Judge | $Y_1$ | Judge | $Y_2$ | Judge | Fatigue strength (MPa) | Judge | Cracking Presence/absence | Toughness Absorbed energy (J) | Judge |
|---|---|---|---|---|---|---|---|---|---|---|---|---|---|---|---|
| Comparative example | 43 | 444 | 0.3 | 3.2 | 0.09 | x | −89 | x | — | — | 165 | x | Absence | 78 | ○ |
| | 44 | 275 | 0.3 | 2.6 | 0.12 | x | 88 | ◎ | 18 | ◎ | — | x | Presence | 17 | x |
| | 45 | 425 | 0.4 | 3.2 | 0.13 | x | −58 | x | — | — | 193 | x | Absence | 81 | ○ |
| | 46 | 470 | 0.2 | 3.2 | 0.06 | x | −127 | x | — | — | 170 | x | Absence | 64 | ○ |
| | 47 | 419 | 0.7 | 3.2 | 0.22 | x | −17 | x | — | — | 193 | x | Absence | 85 | ○ |
| | 48 | 414 | 0.2 | 3.2 | 0.06 | x | −71 | x | — | — | 172 | x | Absence | 80 | ○ |
| | 49 | 440 | 0.3 | 3.2 | 0.09 | x | −85 | x | — | — | 180 | x | Absence | 74 | ○ |
| | 50 | 420 | 2.1 | 9.0 | 0.23 | x | −13 | x | — | — | 197 | x | Absence | 86 | ○ |
| | 51 | 623 | 0.2 | 3.2 | 0.06 | x | −280 | x | — | — | 164 | x | Absence | 91 | ○ |
| | 52 | 280 | 0.3 | 2.6 | 0.12 | x | 83 | ◎ | 13 | ◎ | — | x | Presence | 9 | x |
| | 53 | 440 | 2.1 | 4.0 | 0.53 | ○ | 77 | ◎ | 7 | ◎ | — | x | Presence | 50 | ○ |
| | 54 | 455 | 2.4 | 3.6 | 0.67 | ○ | 115 | ◎ | 45 | ◎ | — | x | Presence | 62 | ○ |
| | 55 | 275 | 0.2 | 3.5 | 0.06 | x | 66 | ◎ | −4 | ○ | — | x | Presence | 5 | x |
| | 56 | 615 | 1.2 | 2.2 | 0.55 | ○ | −90 | x | — | — | — | x | Presence | 98 | ○ |
| | 57 | 254 | 0.4 | 2.6 | 0.15 | x | 124 | ◎ | 54 | ◎ | — | x | Presence | 19 | x |
| | 58 | 199 | 0.6 | 2.9 | 0.21 | x | 199 | ◎ | 129 | ◎ | — | x | Presence | 22 | x |
| | 59 | 211 | 0.2 | 3.4 | 0.06 | x | 131 | ◎ | 61 | ◎ | — | x | Presence | 1 | x |
| | 60 | 377 | 0.3 | 3.4 | 0.09 | x | −24 | x | — | — | — | x | Presence | 10 | x |
| | 61 | 546 | 0.5 | 2.3 | 0.22 | x | −144 | x | — | — | 175 | x | Absence | 118 | ○ |

Nos. 1-24 are the examples of the present patent application. The relation between the Ms point of the weld metal and ρ/t satisfied the range stipulated in the present patent application, a cracking defect did not occur, and fatigue strength improvement was recognized. The toughness was excellent as well.

On the other hand, Nos. 25-61 are the comparative examples whose results are as follows.

In Nos. 25-27, although the Ms point and ρ/t satisfied the stipulated range respectively, due to the property of the joint not satisfying the expression (1) which was the correlation expression thereof, fatigue strength improving effect was not recognized. In No. 28, because ρ/t was below the stipulated range, the fatigue strength improving effect was not recognized. In No. 29, because C content of the wire was insufficient, the Ms point exceeded the stipulated range. Therefore, the fatigue strength improving effect was not recognized.

In No. 30, because C content of the wire was excessively high, the Ms point became too low, the hardness of the weld metal became too high, and delayed cracking occurred. Also, solidification cracking occurred as well. Because of this, the specimen broke in a short time in the fatigue test, and therefore strength at finite life of $10^7$ times could not be secured. Furthermore, it was inferior in the toughness also. In No. 31, because Si content was insufficient, the wettability lowered, the shape of the toe part deteriorated, and the expression (1) was not satisfied. Therefore, the fatigue strength improving effect was not recognized. In No. 32, because Si content was excessively high, the viscosity of the molten pool rose, the toe shape deteriorated, and the expression (1) was not satisfied. Therefore, the fatigue strength improving effect was not recognized. Furthermore, it was inferior in the toughness also.

In No. 33, because Mn content was insufficient, the quenchability was insufficient, the Ms point exceeded the stipulated range, and the expression (1) was not satisfied. Therefore, the fatigue strength improving effect was not recognized. In No. 34, because Mn content was excessively high, the Ms point became too low, the hardness of the weld metal became too high, and delayed cracking occurred. Because of this, the specimen broke in a short time in the fatigue test, and therefore the fatigue strength at finite life of $10^7$ times could not be secured. Furthermore, it was inferior in the toughness also. In Nos. 35, 36, the total amount of oxides exceeded the stipulated range of the present patent application, the arc stability was not improved in pure Ar gas welding, the bead shape deteriorated also, and ρ/t and the calculation result of the expression (1) were out of the stipulated range. Therefore, the fatigue strength improving effect was not recognized.

In No. 37, because Ti content was excessively high, the arc stability deteriorated, the wettability of the toe part of welding also deteriorated, and ρ/t was below the stipulated range. Further, the expression (1) was not satisfied. Therefore, the fatigue strength improving effect was not recognized. In Nos. 38, 39, 40, because Mo content, Cr content, Ni content were excessively high respectively, the Ms point became too low, the hardness of the weld metal became too high, and delayed cracking occurred. Because of this, the specimen broke in a short time in the fatigue test, and therefore the fatigue strength at finite life of $10^7$ times could not be secured. Furthermore, it was inferior in the toughness also.

In No. 41, because the flux ratio of the wire was insufficient, the arc stability was not improved in pure Ar gas welding, the bead shape deteriorated also, and ρ/t and the calculation result of the expression (1) were out of the stipulated range. Therefore, the fatigue strength improving effect was not recognized. In No. 42, because the flux ratio of the wire was excessively high by contraries, the arc stability was not improved in pure Ar gas welding, the bead shape deteriorated also, and ρ/t and the calculation result of the expression (1) were out of the stipulated range. Therefore, the fatigue strength improving effect was not recognized. Furthermore, wire manufacturing itself was difficult also. In No. 43, the wire satisfied the stipulated range, however the shielding gas was not pure Ar but a commonly and frequently used oxidizing gas with the gas mixture composition of 80 vol % Ar and 20 vol % $CO_2$. By combination with the oxidizing gas, the bead did not spread, the wettability of the toe part of welding deteriorated, and ρ/t and the calculation result of the expression (1) were inferior to the stipulated range. Therefore, the fatigue strength improving effect was not recognized.

In No. 44, a gas mixture was used which had the composition of 90 vol % Ar and 10 vol % $CO_2$ having oxidizing property also, while the oxidizing property was slightly weaker. Therefore, the bead did not spread also, the wettability of the toe part of welding deteriorated, and ρ/t was below the stipulated range. Also, because Cr content and Ni content were excessively high, the Ms point became too low, the hardness of the weld metal became too high, and delayed cracking occurred. Because of this, the specimen broke in a short time in the fatigue test, and therefore the fatigue strength at finite life of $10^7$ times could not be secured. Furthermore, it was inferior in the toughness also. In No. 45, a gas mixture was used which had the composition of 98 vol % Ar and 2 vol % $CO_2$ having further lower oxidizing property. However, still the bead did not spread, the wettability of the toe part of welding deteriorated, and ρ/t and the calculation result of the expression (1) were inferior to the stipulated range. Therefore, the fatigue strength improving effect was not recognized.

In No. 46, $CO_2$ welding was performed. Generally, in $CO_2$ welding, the low spatter effect that is a feature of the pulse welding method is not exerted, and therefore the current waveform is also combined with ordinary constant current/constant voltage characteristic. However, according to the combination with the wire stipulated in the present patent application, the arc stability was inferior, the wettability of the toe part of welding deteriorated, and ρ/t and the calculation result of the expression (1) were inferior to the stipulated range. Therefore, the fatigue strength improving effect was not recognized. In No. 47, although the wire composition and the shielding gas composition satisfied the range of the present patent application, the current waveform was not the pulse but with constant current/constant voltage characteristic. However, with this waveform, the arc was unstable, the wettability of the toe part of welding deteriorated also, and ρ/t and the calculation result of the expression (1) were inferior to the stipulated range. Therefore, the fatigue strength improving effect was not recognized.

In No. 48, the wire form is a wire-like solid wire. Therefore, when combined with pure Ar, the arc stability was extremely inferior, the wettability of the toe part of welding deteriorated also, and ρ/t and the calculation result of the expression (1) were inferior to the stipulated range. Therefore, the fatigue strength improving effect was not recognized. In a similar manner, No. 49 is a solid wire and the shielding gas is a gas mixture having the composition of 90 vol % Ar and 10 vol % $CO_2$ having oxidizing property. Therefore, although the arc stability was improved, the arc did not spread as in the welding method according to the present invention and the bead did not spread also. Accordingly, the wettability of the toe part of welding deteriorated also, and ρ/t and the calculation result of the expression (1) were inferior to the stipulated range. Therefore, the fatigue strength improving effect was not recognized.

In No. 50, the wire form, wire composition, shielding gas composition, and current waveform satisfied the stipulated range, however related with the combination with the sheet thickness, ρ/t and the calculation result of the expression (1) were inferior to the stipulated range. Therefore, the fatigue strength improving effect was not recognized. In No. 51, a flux-cored wire that was commonly distributed, the gas composition used therefor and the current waveform were combined. Because C content was insufficient, the quenchability was insufficient and the Ms point exceeded the stipulated range. Also, because the amount of the oxide was excessively high and oxidizing gas and the waveform of constant current/constant voltage characteristic were used, there was no bead shape improving effect, and ρ/t and the calculation result of the expression (1) were out of the stipulated range. Therefore, the fatigue strength improving effect was not recognized.

No. 52 is a high C-based low temperature transformation welding material proposed before, however, the Ms point was too low, the hardness of the weld metal became too high, and delayed cracking occurred. Further, solidification cracking occurred also. Because of this, the specimen broke in a short time in the fatigue test, and therefore the fatigue strength at finite life of $10^7$ times could not be secured. Further, it was inferior in the toughness also. Furthermore, ρ/t was out of the stipulated range. In Nos. 53, 54, P content and S content were excessively high respectively, and solidification cracking occurred. Because of this, the specimen broke in a short time in the fatigue test, and therefore the fatigue strength at finite life of $10^7$ times could not be secured.

No. 55 is a specimen imitating the joint No. 3 described in Japanese Unexamined Patent Application Publication No. 2004-136313. However peening treatment was not performed. Whether the wire was a solid wire or an FCW is not clear in Japanese Unexamined Patent Application Publication No. 2004-136313, however a solid wire and a gas mixture of 80 vol % Ar and 20 vol % $CO_2$ were used here, therefore ρ/t was low, and stress concentration was not improved. Also, C content was excessively high, and hot cracking and solidification cracking occurred although the Ms point was low. Because of this, the specimen broke in a short time in the fatigue test, and therefore the fatigue strength at finite life of $10^7$ times could not be secured. Further, it was inferior in the toughness also. No. 56 is a specimen imitating the wire No. 7 described in Japanese Unexamined Patent Application Publication No. 2002-361480. Although ρ/t was raised by adding an extremely large amount of S, solidification cracking occurred. Because of this, the specimen broke in a short time in the fatigue test, and therefore the fatigue strength at finite life of $10^7$ times could not be secured. Also, lowering of a residual stress due to lowering of the Ms point did not occur.

No. 57 is a specimen imitating the wire No. 8 described in Japanese Unexamined Patent Application Publication No. 2004-98108. Although the Ms point was lowered and a residual stress was improved by adding a large amount of Mn and Ni, the hardness of the weld metal became too high, and delayed cracking occurred. Because of this, the specimen broke in a short time in the fatigue test, and therefore the fatigue strength at finite life of $10^7$ times could not be secured. Further, it was inferior in the toughness also. In addition, the gas mixture of 80 vol % Ar and 20 vol % $CO_2$ was applied, ρ/t was low, and stress concentration was not improved. In No. 58, the condition of No. 3 described in Japanese Unexamined Patent Application Publication No. 2004-98113 was imitated. Although the Ms point was lowered and a residual stress was improved by adding a large amount of Ni and Cr, the hardness of the weld metal became too high, and delayed cracking occurred. Because of this, the specimen broke in a short time in the fatigue test, and therefore the fatigue strength at finite life of $10^7$ times could not be secured. Further, it was inferior in the toughness also. In addition, the gas mixture of 98 vol % Ar and 2 vol % $O_2$ was applied, ρ/t was low, and stress concentration was not improved.

No. 59 is a specimen imitating the wire No. b described in Japanese Unexamined Patent Application Publication No. 2001-246495. Although the Ms point was lowered and a residual stress was improved by adding a large amount of Ni and Cr, the hardness of the weld metal became too high, and delayed cracking occurred. Because of this, the specimen broke in a short time in the fatigue test, and therefore the fatigue strength at finite life of $10^7$ times could not be secured. Further, it was inferior in the toughness also. In addition, a shielding gas was not used, not only ρ/t was low and the stress concentration improving effect was not secured, but also the blowholes were generated as well (not shown in the Table). No. 60 is a specimen imitating the wire No. W5 described in Japanese Patent No. 4173957. Using a gas mixture of 80 vol % Ar and 20 vol % $CO_2$, ρ/t was low and the stress concentration improving effect was not secured. Also, C content was excessively high, and hot cracking and solidification cracking occurred although the Ms point was low. Because of this, the specimen broke in a short time in the fatigue test, and therefore the fatigue strength at finite life of $10^7$ times could not be secured. Further, it was inferior in the toughness also.

No. 61 is a specimen imitating the wire No. C described in Japanese Unexamined Patent Application Publication No. H8-25080. Because a solid wire and a gas mixture of 80 vol % Ar and 20 vol % $CO_2$ were combined, ρ/t was low and the stress concentration improving effect was not secured. Also, the expression (1) stipulating the Ms point and ρ/t was not satisfied, and the fatigue strength improving effect was not secured.

Second Example

The second example relates to a fillet weld joint in relation with the second embodiment and the third embodiment and the method for gas shielded arc welding.

The method for testing, the method for evaluation and the like are similar to those for the first example, and the composition of the base metal and the composition of the sheath of the flux-cored wire are also similar.

Further, the wire form, componential composition in the flux, shielding gas composition, condition of the power source, and arc stability are similar to those of Nos. 1-24, 29-49, 51-61 in Tables 3-5 of the first example. The results also are similar to those of Nos. 1-24, 29-49, 51-61 in Tables 6-8. Therefore, here, description will be made referring to Tables 3-8.

Nos. 1-24 are the examples of the present patent application. The componential composition and the relation between the Ms point of the weld metal and ρ/t satisfied the stipulated range of the present patent application, the crack defect did not occur, and fatigue strength improvement was recognized. It was also excellent in the toughness. Further, its manufacturing condition also satisfied the invented range of the present patent application, and the Ms point and ρ could be optimized.

On the other hand, Nos. 29-49, 51-61 are the comparative examples. Also, with respect to the comparative examples, description is similar to that for the first example, and therefore it is omitted here.

Although the present invention was described above in detail referring to the embodiments and the examples, the purpose of the present invention is not limited to the contents described above, and the scope of its right is to be broadly interpreted based on the description of the claims. Also, it is obvious that the contents of the present invention can be modified, altered and the like broadly based on the descriptions above.

What is claimed is:

1. A fillet weld joint of steel formed by arc welding, wherein
    the fillet weld joint is formed by welding a weld metal to a base metal during said arc welding,
    a martensitic transformation starting temperature (Ms point) of said weld metal is 400° C. or above and 550° C. or below,
    a value obtained by dividing a toe radius ρ of a toe part of said fillet weld joint by a sheet thickness t of said base metal (ρ/t) is 0.25 or above,
    an expression $Ms(° C.) \leq 375 \times [ρ/t] + 320$ is satisfied, and
    a crack defect does not exist in the fillet weld joint.

2. The fillet weld joint according to claim 1, wherein an expression $Ms(° C.) \leq 375 \times [ρ/t] + 250$ is satisfied.

3. The fillet weld joint according to claim 1, wherein a sheet thickness of a base metal subjected to the arc welding is 6 mm or below.

4. A fillet weld joint of steel formed by arc welding using pure Ar gas as a shielding gas and using a flux-cored wire as a wire, wherein
    the wire comprises a steel hoop or a steel pipe as a sheath, and comprises, in terms of the total mass of the wire:
    C: 0.08-0.32 mass %,
    Si: 0.40-3.00 mass %,
    Mn: 1.00-5.00 mass %,
    P: 0.030 mass % or below,
    S: 0.030 mass % or below, and suppresses total oxides to 1.0 mass % or below,
    with a mass ratio of total flux with respect to the wire being 7-30 mass %, a current or voltage waveform of a power source is formed employing a pulse waveform, and a crack defect does not exist.

5. The fillet weld joint according to claim 4, wherein the wire further comprises, in terms of the total mass of the wire, a total of Ti, Zr, Al and Mg (Ti+Zr+Al+Mg) in an amount of 0.80 mass % or below.

6. The fillet weld joint according to claim 4, wherein the wire further comprises, in terms of the total mass of the wire, at least one element selected from the group consisting of Ni: 3.0 mass % or below, Cr: 3.0 mass % or below and Mo: 3.0 mass % or below.

7. A fillet weld joint of steel formed by arc welding using pure Ar gas as a shielding gas and using a flux-cored wire as a wire, wherein
    the wire uses a steel hoop or a steel pipe as a sheath, comprises, in terms of the total mass of the wire,
    C: 0.08-0.32 mass %,
    Si: 0.40-3.00 mass %,
    Mn: 1.00-5.00 mass %,
    P: 0.030 mass % or below,
    S: 0.030 mass % or below, and suppresses total oxides to 1.0 mass % or below,
    with a mass ratio of total flux with respect to the wire being 7-30 mass %,
    a current or voltage waveform of a power source is formed employing a pulse waveform, a martensitic transformation starting temperature (Ms point) of a weld metal is 400° C. or above and 550° C. or below,
    a value obtained by dividing a toe radius ρ of a toe part of welding by a sheet thickness t of a base metal (ρ/t) is 0.25 or above, an expression $Ms(° C.) \leq 375 \times [ρ/t] + 320$ is satisfied, and a crack defect does not exist.

8. A method for gas shielded arc welding using a flux-cored wire, comprising:
    performing gas shielded arc welding with pure Ar gas as a shielding gas and using said flux-cored wire, and
    employing a pulse waveform as a current or voltage waveform of a power source,
    wherein the flux-cored wire uses a steel hoop or a steel pipe as a sheath, comprises, in terms of the total mass of the wire,
    C: 0.08-0.32 mass %,
    Si: 0.40-3.00 mass %,
    Mn: 1.00-5.00 mass %,
    P: 0.030 mass % or below, S: 0.030 mass % or below, and suppresses total oxides to 1.0 mass % or below, with a mass ratio of total flux with respect to the wire being 7-30 mass %.

9. The method for gas shielded arc welding according to claim 8, wherein the flux-cored wire further comprises, in terms of the total mass of the wire, a total of Ti, Zr, Al and Mg (Ti+Zr+Al+Mg) in an amount of 0.80 mass % or below.

10. The method for gas shielded arc welding according to claim 8, wherein the wire further comprises, in terms of the total mass of the wire, at least one element selected from the group consisting of
    Ni: 3.0 mass % or below, Cr: 3.0 mass % or below and Mo: 3.0 mass % or below.

* * * * *